United States Patent
Li et al.

(10) Patent No.: US 10,931,710 B2
(45) Date of Patent: Feb. 23, 2021

(54) METHOD AND DEVICE FOR DEFENDING AGAINST NETWORK ATTACKS

(71) Applicant: Alibaba Group Holding Limited, George Town (KY)

(72) Inventors: Han Li, Hangzhou (CN); Yaxiong Duan, Hangzhou (CN); Jiong Jia, Hangzhou (CN)

(73) Assignee: Alibaba Group Holding Limited

( * ) Notice: Subject to any disclaimer, the term of this patent is extended or adjusted under 35 U.S.C. 154(b) by 175 days.

(21) Appl. No.: 15/153,534

(22) Filed: May 12, 2016

(65) Prior Publication Data

US 2016/0337397 A1    Nov. 17, 2016

(30) Foreign Application Priority Data

May 15, 2015   (CN) .......................... 201510250887.4

(51) Int. Cl.
  *H04L 29/06*   (2006.01)
  *H04L 29/08*   (2006.01)
  *H04L 12/26*   (2006.01)

(52) U.S. Cl.
  CPC .......... *H04L 63/1458* (2013.01); *H04L 67/02* (2013.01); *H04L 43/0876* (2013.01);
  (Continued)

(58) Field of Classification Search
  CPC ............................ H04L 63/1458; H04L 67/02
  (Continued)

(56) References Cited

U.S. PATENT DOCUMENTS 7,234,168 B2   6/2007 Gupta et al.
7,379,423 B1   5/2008 Caves et al.
(Continued)

FOREIGN PATENT DOCUMENTS

CN    104202314 A    12/2014
JP    2003099339     4/2003
(Continued)

OTHER PUBLICATIONS

Author Unknown, "Local RBL Configuration", LIBRAESVA, downloaded from: http://docs.libraesva.com/libra-esva-manual/system/local-rbl-configuration/ on Jul. 19, 2016, published Sep. 7, 2014.
(Continued)

*Primary Examiner* — Dant B Shaifer Harriman
(74) *Attorney, Agent, or Firm* — Van Pelt, Yi & James LLP

(57) ABSTRACT

Embodiments of the present application relate to a method and device for defending against website attacks. The method includes obtaining a traffic threshold value corresponding to a target IP address, determining whether real-time visitor traffic for the target IP address exceeds the traffic threshold value, and handling visitor traffic for the target IP address based at least in part on whether the real-time visitor traffic for the target IP address exceeds the traffic threshold value, wherein the handling incoming visitor traffic for the target IP address based at least in part on whether the real-time visitor traffic for the target IP address exceeds the traffic threshold value includes, in the event that the real-time visitor traffic for the target IP address exceeds the traffic threshold value, configuring a blackhole route for the target IP address, and redirecting the incoming visitor traffic for the target IP address to the blackhole route.

25 Claims, 7 Drawing Sheets

(52) U.S. Cl.
CPC .......... *H04L 43/16* (2013.01); *H04L 63/0236* (2013.01); *H04L 63/1425* (2013.01)

(58) Field of Classification Search
USPC ........................................................ 726/23
See application file for complete search history.

(56) References Cited

U.S. PATENT DOCUMENTS

| | | | |
|---|---|---|---|
| 7,411,957 B2 | 8/2008 | Stacy et al. | |
| 7,526,807 B2* | 4/2009 | Chao | H04L 63/1408 726/23 |
| 7,584,507 B1 | 9/2009 | Nucci | |
| 7,694,338 B1 | 4/2010 | Jafari | |
| 8,089,871 B2 | 1/2012 | Iloglu et al. | |
| 8,161,145 B2 | 4/2012 | Carpenter et al. | |
| 8,613,089 B1 | 12/2013 | Holloway et al. | |
| 8,955,128 B1* | 2/2015 | Trama | H04L 63/1491 726/23 |
| 2002/0002686 A1 | 1/2002 | Vange et al. | |
| 2002/0133586 A1* | 9/2002 | Shanklin | H04L 43/00 709/224 |
| 2002/0166063 A1* | 11/2002 | Lachman, III | H04L 63/0263 726/23 |
| 2004/0030923 A1 | 2/2004 | Tindal et al. | |
| 2004/0054925 A1 | 3/2004 | Etheridge et al. | |
| 2005/0133586 A1* | 6/2005 | Rekeweg | G06Q 20/042 235/379 |
| 2005/0144467 A1* | 6/2005 | Yamazaki | H04L 63/0227 713/189 |
| 2005/0180416 A1 | 8/2005 | Jayawardena et al. | |
| 2006/0010389 A1 | 1/2006 | Rooney et al. | |
| 2006/0242694 A1 | 10/2006 | Gold et al. | |
| 2007/0097976 A1 | 5/2007 | Wood et al. | |
| 2007/0162587 A1 | 7/2007 | Lund et al. | |
| 2007/0280114 A1* | 12/2007 | Chao | H04L 43/0888 370/235.1 |
| 2008/0127338 A1* | 5/2008 | Cho | G06F 21/566 726/22 |
| 2008/0270601 A1 | 10/2008 | Ishikawa | |
| 2009/0031040 A1 | 1/2009 | Jayawardena et al. | |
| 2009/0254970 A1* | 10/2009 | Agarwal | G06F 21/554 726/1 |
| 2010/0185760 A1* | 7/2010 | Nakahira | H04L 41/142 709/224 |
| 2012/0266242 A1 | 10/2012 | Yang et al. | |
| 2014/0109225 A1 | 4/2014 | Holloway | |
| 2015/0026800 A1 | 1/2015 | Jain | |
| 2015/0040220 A1 | 2/2015 | Mantripragada et al. | |
| 2016/0050224 A1* | 2/2016 | Ricafort | H04L 61/2007 726/23 |
| 2016/0182561 A1* | 6/2016 | Reynolds, II | H04L 41/0686 726/1 |
| 2016/0248806 A1* | 8/2016 | Smith | H04L 63/1458 |
| 2018/0013787 A1* | 1/2018 | Jiang | H04L 29/06 |

FOREIGN PATENT DOCUMENTS

| | | |
|---|---|---|
| JP | 2005130121 A | 5/2005 |
| JP | 2006100874 A | 4/2006 |
| JP | 2008501296 A | 1/2008 |
| JP | 2008177714 A | 7/2008 |
| JP | 2011519533 A | 7/2011 |
| JP | 2012257102 A | 12/2012 |
| RU | 2496136 C1 | 10/2013 |
| WO | 2005116851 A2 | 12/2005 |
| WO | 2009130203 A1 | 10/2009 |

OTHER PUBLICATIONS

Business Communication, Japan, Business Communication Corporation, 2008, vol. 45, No. 9, p. 73.

* cited by examiner

METHOD AND DEVICE FOR DEFENDING AGAINST NETWORK ATTACKS

CROSS REFERENCE TO OTHER APPLICATIONS

This application claims priority to People's Republic of China Patent Application No. 201510250887.4 entitled A METHOD AND A DEVICE FOR DEFENDING AGAINST WEBSITE ATTACKS, filed May 15, 2015 which is incorporated herein by reference for all purposes.

FIELD OF THE INVENTION

The present application relates to the field of network security technology. In particular, the present application relates to a method, a device, and system for defending against website attacks.

BACKGROUND OF THE INVENTION

A distributed denial of service (DDoS) attack is an attack in which multiple computers form an attack platform that attacks a target. For example, with the help of client/server technology, multiple computers are united into an attack platform that launches a DDoS attack on one or multiple targets and thus multiplies the threat of a denial of service attack. Generally, an attacker planning to launch a DDOS attack installs a DDoS master program on a single computer. At a set time, the DDoS master program communicates with a large number of agents. The agents are installed on computers that are connected to the Internet. The agents launch the DDoS attack upon receiving an instruction from the DDoS master program. Using client/server technology, the DDoS master program can launch hundreds or thousands of agent operations within a few seconds. The principle of a DDoS attack is to find the victim's resource bottleneck and make the victim's services unavailable by using up its resources. Server CPUs, memory, bandwidth, and databases may become resource bottlenecks. For example, according to current network and e-commerce architecture, all of the server CPUs, memory, bandwidth, and databases associated with an Internet business may become resource bottlenecks for such an Internet business. As an ever-increasing number of users make use of virtualized data centers and cloud services, the focus of DDoS attacks has begun to shift towards cloud computing.

A common method of defending against DDoS attacks is to configure a blackhole route on a router for the attacked IP address. The blackhole route sucks in identified oblivious routes and thereby extinguishes such routes. The outbound interface of a blackhole route is designated the "null0" interface. All data sent to a null0 interface will be discarded. Thus, all of the traffic to an attacked address can be discarded. By sacrificing the traffic to an attacked IP address, the availability of network bandwidth resources of other unattacked IP addresses is protected. Moreover, the effects on system load are extremely small.

According to some related art, the routing blackhole defense scheme includes issuing traffic of a particular IP address to a blackhole route in the event that the visitor traffic for an IP address exceeds a given traffic threshold value (also referred to as a blackhole threshold value). However, a defense that involves a given traffic threshold value suffers from various defects. For example, the given traffic threshold value defense cannot adapt to differences in services and traffic of different users. Accordingly, users will have bad experiences if a defense is mounted using the same traffic threshold value for various users. As another example, the diversion of user traffic into a blackhole will prevent users from accessing the server normally for a period of time. Therefore, the casting of attacked services into a blackhole is, in fact, the equivalent of a successful attack. Therefore, the given traffic threshold value defense is very easily put to use by hackers.

BRIEF DESCRIPTION OF THE DRAWINGS

Various embodiments of the invention are disclosed in the following detailed description and the accompanying drawings.

The features, objectives, and advantages of the present application will become more apparent through reading the detailed descriptions of the non-restrictive embodiments made with reference to the figures below.

Figure 1A:
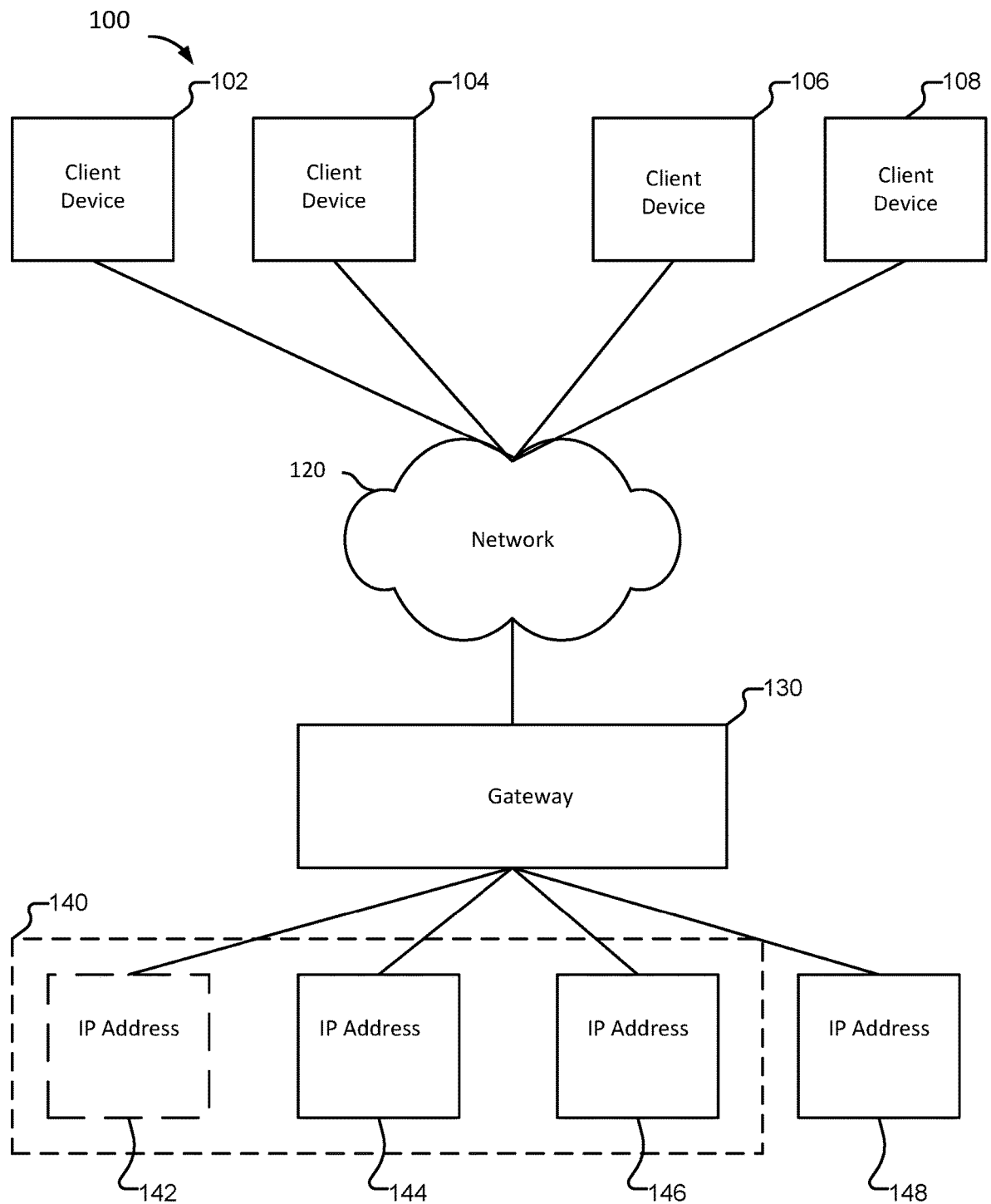
FIG. 1A is a block diagram of a system for defending against network attacks according to various embodiments of the present disclosure.

The same or similar marks in the drawings represent same or similar components.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Before discussing exemplary embodiments in greater detail, we should mention some exemplary embodiments described as flowchart-depicted processing or methods. Although the flowcharts describe each operation sequentially, many of the operations could be implemented in parallel or simultaneously. In addition, the sequence of each operation could be re-arranged. When its operations are completed, said processing may be terminated. Yet there may also be supplementary steps not included in the drawings. Said processing may correspond to methods, functions, rules, subroutines, sub-programs, and so on.

The "computer equipment" (also called "computers") that appears in the text above and below refers to smart electronic equipment that can execute predetermined processing procedures such as numerical calculations and/or logical calculations by running predetermined programs or instructions. Such computer equipment may include processors and memory, wherein the processors execute predetermined processing procedures by executing pre-saved existing instructions, or wherein hardware such as application-specific integrated circuits (ASIC), field-programmable gate arrays (FPGA), or digital signal processors (DSP) execute predetermined processing procedures, or wherein a combination of both of the above accomplishes the same. Computer equipment includes, but is not limited to, servers, personal computers, notebook computers, tablet computers, and smartphones.

The computer equipment includes user equipment and network equipment. The user equipment includes, but is not limited to, computers, smartphones, and personal digital assistants (PDAs). The network equipment includes, but is not limited to, single network servers, server groups composed of multiple network servers, or clouds consisting of large numbers of cloud computing-based computers or network servers, wherein the cloud computing is a kind of distributed computing: a super virtual computer composed of a collection of loosely coupled computers. The computer equipment may be run by itself to achieve the present application. The computer equipment may be connected to a network and achieve the present application through inter-operation with other computer equipment in a network. The networks in which said computer equipment are found include, but are not limited to, the Internet, wide area networks (WANs), metropolitan area networks (MANs), local area networks (LANs), and virtual private networks (VPNs).

Please note that the user equipment, network equipment, and networks are merely examples. Other computer equipment or networks, which currently exist or may appear in the future, should also be contained within the protective scope of the present application if such computer equipment or networks can be applied to the present application, and their forms of reference shall also be contained herein.

The methods (some of which are depicted by flowcharts) discussed below may be implemented through hardware, software, firmware, middleware, microcode, hardware description language, or any combination thereof. When the methods are implemented through software, firmware, middleware, or microcode, the program code or code segment used to implement the necessary tasks can be stored on a machine or computer-readable medium (e.g., a storage medium). One or more processors may implement the necessary tasks.

The specific structures and function details disclosed herein are merely representative and are used for the purpose of describing exemplary embodiments of the present application. However, the present application may be concretely implemented through many alternative forms. Moreover, it should not be interpreted as being merely limited to the embodiments set forth here.

Please understand that although the terms "first," "second," and so on are used to describe various units, these units should not be limited by these terms. These terms are used only in order to differentiate one unit from another. To give an example, so long as they do not depart from the scope of the exemplary embodiment, a first unit may be referred to as a second unit, and similarly a second unit may be referred to as a first unit. The term "and/or" used herein includes any or all combinations of one or more listed related items.

The terms used here only have the purpose of describing specific embodiments and are not intended to restrict the exemplary embodiments. Unless otherwise made explicit by the context, the singular forms "a" or "an" used herein are also intended to include the plural. Please also understand that the terms "comprise" and/or "contain" as used herein specify the existence of the stated features, integers, steps, operations, units, and/or components and do not exclude the existence or the addition of one or more other features, integers, steps, operations, units, components, or combinations thereof.

Also deserving of mention is the fact that, in some alternative implementations, the mentioned functions/actions may occur according to a sequence other than that indicated in the drawings. For example, depending on the functions/actions that are in question, two pictures that are depicted in sequence may be executed basically at the same time or sometimes executed according to the opposite sequence.

The present application is described in further detail below in light of the drawings.

Various embodiments include a method and/or a device for defending against website or network attacks. For example, various embodiments include methods and/or devices for defending against network traffic attacks, particularly, distributed denial of service (DDoS) attacks.

FIG. 1A is a block diagram of a system for defending against network attacks.

Referring to FIG. 1A, system 100 for defending against network attacks is provided. System 100 can be implemented in connection with process 150 of FIG. 1B, device 400 of FIG. 4, device 500 of FIG. 5, or computer system 600 of FIG. 6.

System 100 includes a network gateway 130 via which IP addresses 142, 144, 146, and 148 can be accessed. A set of IP addresses 140 may be associated with (e.g., owned by) a user. For example, IP addresses 142, 144, and 146 can belong to the same user. The network gateway 130 can be associated with (e.g., managed by) a service provider, and the service provider can provide IP services to a plurality of customers. The user associated with IP addresses 142, 144, and 146 can be a customer of the service provider associated with the network gateway 130. The customer (e.g., the user associated with the IP addresses 142, 144, and 146) can use the service provider's infrastructure (e.g., the network gateway 130) to provide services to clients. For example, the customer can provide SaaS services via the service provider. The service provider can provide hosting services or the like. The network gateway 130 can route traffic to an IP address based at least in part on an access request received from a client. For example, client devices 102, 104, 106, and 108 can communicate requests (e.g., access requests) to IP addresses via network 120. A request from a client device can be routed through the network gateway 130 and the network gateway 130 can direct the request to the particular IP address(es) corresponding to the request.

In a DDoS attack, a plurality of the client devices 102, 104, 106, and 108 can launch a DDoS attack on one or more of the IP addresses 142, 144, and 146 associated with the client. For example, target IP addresses of a request can correspond to IP addresses 144 and 146 of a user.

Figure 1B:
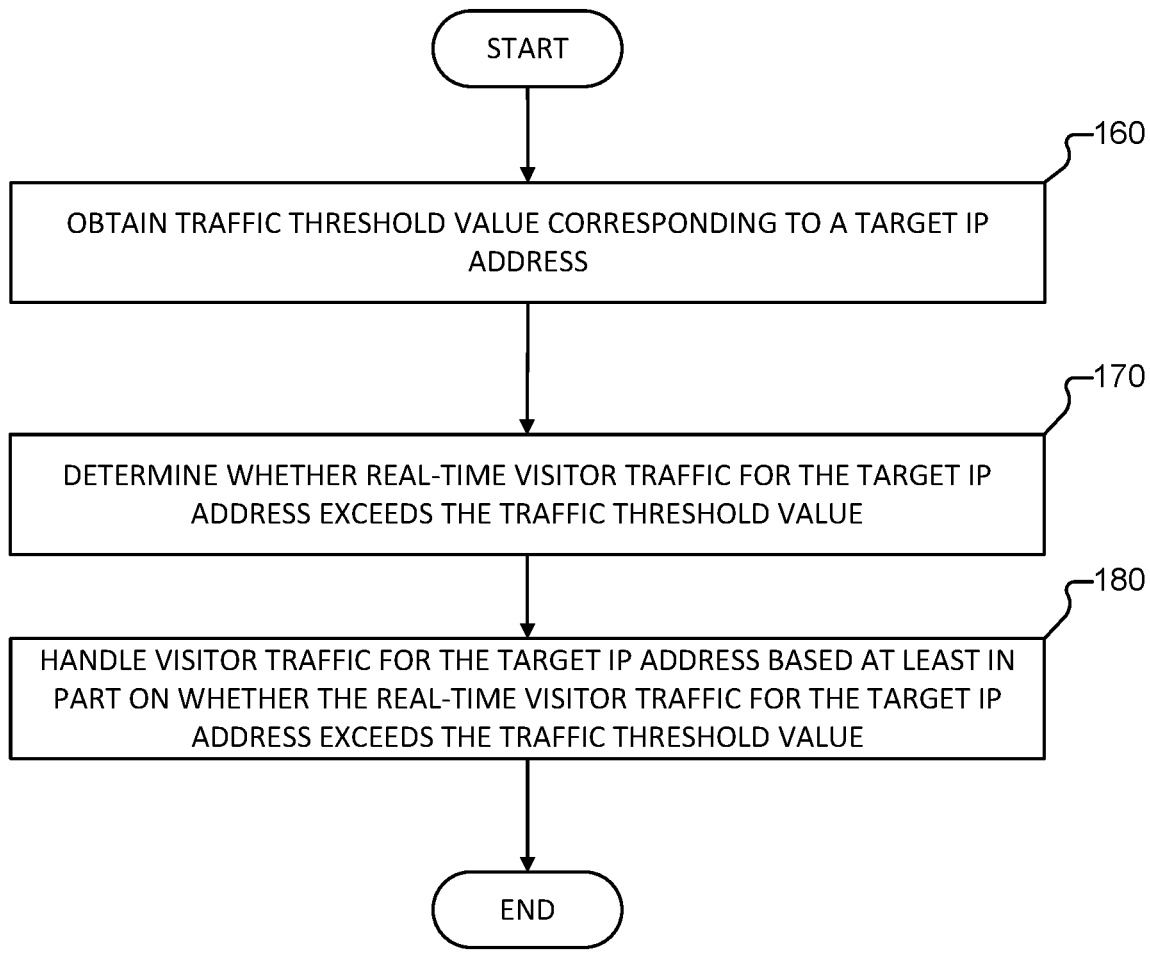
FIG. 1B is a flowchart of a method for defending against network attacks according to various embodiments of the present disclosure.

FIG. 1B is a flowchart of an embodiment of a method for defending against network attacks.

Referring to FIG. 1B, process 150 for defending against network attacks is provided. Process 150 can be implemented by, for example, device 400 of FIG. 4, device 500 of FIG. 5, or computer system 600 of FIG. 6.

In some embodiments, process 150 is used at (e.g., implemented by) a network entry gateway. For example, process 150 can be used to configure a suitable route for visitor traffic entering a network in order to attain the location to which the visitor traffic should go. In some embodiments, process 150 is executed by (e.g., implemented by) a special secure server configured in the network. Access traffic entering the network undergoes processing by this secure server and then is sent to the proper location. For example, all the traffic entering the network can be processed by the secure server (e.g., according to process 150) and routed to the proper location.

At 160, a traffic threshold value corresponding to a target IP address is obtained.

According to some embodiments, in a system for defending against attacks, not every user's (e.g., a bank's, Internet business, or the like) corresponding source IP address (e.g., the IP address of the user server) receives external visits directly. In some embodiments, the user is a customer of a service provider that allows the customer to use infrastructure of the service provider to provide network services (e.g., to host an e-commerce website, or the like). Rather, in some embodiments, the source IP address corresponding to at least some users receives external visits via several forwarding IP addresses of the source IP address. For example, computer or network equipment can route traffic directed to the forwarding IP address to the corresponding source IP address. The target IP address may refer to one of several forwarding IP addresses of any user in the attack-defending system for implementing some embodiments. In some embodiments, the attack-defending system does not defend against attacks for just one user, nor does such system defend against attacks for just one IP address. Rather, such a system defends against attacks directed at, for example, a subset of target IP addresses or all target IP addresses (e.g., forwarding IP addresses) of all users in the network and is responsible for handling received external visitor traffic for each target IP address of each user.

In some embodiments, the traffic threshold value corresponds to a threshold value for redirecting visitor traffic of the target IP addresses. The traffic threshold value can be an empirically determined threshold value that is used in connection with redirecting visitor traffic of the target IP addresses (or a subset thereof) to a blackhole route. In the event that the visitor traffic to a target IP address of a user (e.g., a website, an Internet business, or the like) is excessive (e.g., exceeds a traffic threshold value), such a characteristic may be indicative of the target IP address undergoing an attack. For example, the target IP address may be deemed to be undergoing a network attack in the event that the visitor traffic to a target IP address of a user exceeds the traffic threshold value.

In some embodiments, the traffic threshold value is configured by a network administrator or the like. The traffic threshold value can be configured according to historical information relating to network attacks or other usage data of visitor traffic to a target IP address. In some embodiments, a traffic threshold value can be configured based at least in part on a specific target IP address. For example, the traffic threshold value for a target IP address can be configured according to specific characteristics of the target IP address or of the visitor traffic to the target IP address.

In some embodiments, the traffic threshold value is configured for a user. The user can correspond to the owner of the corresponding IP address (e.g., the target IP address). The target IP address can be one of one or more IP addresses owned by the user. In some embodiments, the traffic threshold value corresponding to a target IP address is the traffic threshold value of the user associated with the target IP address. The traffic threshold values corresponding to target IP addresses associated with the same user can be the same. For example, each of the IP addresses owned by a user can have the same corresponding traffic threshold value.

In some embodiments, the traffic threshold value corresponding to a target IP address can be obtained based at least in part on information relating to the user (e.g., status information of the user) associated with the target IP address and/or the historical visit information on the IP addresses owned or controlled by the user associated with the target IP address. For example, a server or network equipment can obtain (e.g., retrieve) the information relating to the user or the historical visit information (e.g., including historical traffic information) from a database and use such information as a basis for obtaining the traffic threshold value corresponding to the target IP address. The obtaining of the traffic threshold value corresponding to the target IP address can include determining the traffic threshold value (e.g., based at least in part on status information of the user associated with the target IP address and/or the historical visit information on the IP addresses owned or controlled by the user). In some embodiments, the threshold value can be determined or computed based at least in part on a safety evaluation, a simulation, or historical information (e.g., relating to the target IP address).

The status information of the user associated with the target IP address includes the user level of the user associated with said target IP address. The user levels of the user associated with the target IP address can, for example, include ordinary, silver, gold, and diamond and indicate the levels of services provided to the users. The level parameter corresponding to each level is assigned according to a level-setting rule. The level-setting rule can be based at least in part on a subscription of the user or the like. The level setting rule can be used to determine a defense capacity of users. For example, users can be divided among a plurality of levels (e.g., according to the level setting rule). The level-setting can be determined according to historical information such as usage information. For example, if the aforesaid ordinary, silver, gold, and diamond user levels are assigned according to the level from low to high, the level parameters that correspond to the level-based assignments of ordinary, silver, gold, and diamond can be 1, 2, 3 and 4, respectively. The historical visit information for the IP addresses owned by the user associated with the target IP address can include the number of times that the visitor traffic for the IP addresses owned by the user associated with the target IP address was forwarded to a blackhole route within a specific historical period of time and/or the total length of time that the IP addresses owned by the user associated with the target IP address were attacked within the specific historical period of time. The number of times that the visitor traffic for the IP addresses owned by the user associated with the target IP address was forwarded to a blackhole route within a specific historical period of time is the total number of times that the visitor traffic for all of the IP addresses owned by the user was forwarded to a blackhole route within a specific historical period of time (e.g., within one week of the present time). The total length of time that the IP addresses owned by the user associated with the target IP address were attacked within a specific historical period of time is the total of the lengths of time that all the IP addresses owned by the user were attacked within the specific period of time. In some embodiments, the specific historical period of time can be configurable by, for example, a network administrator or the like.

In some embodiments, a rule for determining the preset traffic threshold value is obtained. The rule for determining the preset traffic threshold can be obtained based on an analysis of user data or other historical information. Status information of the user associated with the target IP address and/or the historical visit information on the IP addresses owned by the user associated with the target IP address is used as a basis for determining the traffic threshold value corresponding to the target IP address further based at least in part on the traffic threshold value-determining rule.

In some embodiments, the traffic threshold value corresponding to the target IP address can be determined, based at least in part on a preset traffic threshold value determining rule, based at least in part on one or more of a user level of the user associated with the target IP address, a number of times that the visitor traffic for the IP addresses owned by the user associated with the target IP address was forwarded to a blackhole route within a specific historical period of time, and a total length of time that the IP addresses owned by the user associated with the target IP address were attacked within the specific period of time. The preset traffic threshold value determining rule may be set on the basis of analysis performed on the relevant data within a large volume of historical statistical information. The analysis can be performed on data relating to one or more users and/or one or more IP addresses.

An example traffic threshold value equation for a traffic threshold value determining rule can correspond to Equation (1a) below.

$$\text{HoleThreshold} = h_0 + \text{Level}_1(u) + \text{Black}_1(b) + \text{AttackTime}_1(t) \quad (1a)$$

Referring to Equation (1a), the HoleThreshold corresponds to the traffic threshold value, in Gbps, $h_0$ corresponds to the default traffic threshold (e.g., $h_0$=5 Gbps), $\text{Level}_1(u)$ corresponds to the traffic threshold function of the user level of the user associated with the target IP address, $\text{Black}_1(b)$ corresponds to the traffic threshold function, where b corresponds to the number of times that the visitor traffic for the IP addresses owned by the user associated with the target IP address was forwarded to a blackhole route within a specific historical period of time, and $\text{AttackTime}_1(t)$ is the traffic threshold function, where t corresponds to the total length of time that the IP addresses owned by the user associated with the target IP address were attacked during the specific historical period of time. In some embodiments, the unit of the values in the traffic threshold functions corresponding to the historical visit information and the status information described above is Gbps. Details of the functions are explained below.

Various embodiments implement equations for determining a preset traffic threshold value determining rule different from Equation (1a). The traffic threshold value of the target IP address can be the sum of the default traffic threshold value $h_0$ and any one or more traffic threshold functions.

In some embodiments, the traffic threshold value equation can correspond to Equation (1b), Equation (1c), or Equation (1d).

$$\text{HoleThreshold} = h_0 + \text{Level}_1(u) + \text{Black}_1(b) \quad (1b)$$

$$\text{HoleThreshold} = h_0 + \text{Level}_1(u) + \text{AttackTime}_1(t) \quad (1c)$$

or $$\text{HoleThreshold} = h_0 + \text{Level}_1(u) \quad (1d)$$

The traffic threshold value determining rule can specify that: a traffic threshold value corresponds to an increasing function for the user level of the user associated with the target IP address, and/or a decreasing function for the number of times that the visitor traffic for the IP addresses owned by the user associated with the target IP address was forwarded to a blackhole route within a specific historical period of time, and/or a decreasing function for the total length of time that the IP addresses owned by the user associated with the target IP address were attacked within said specific period of time.

In some embodiments, traffic threshold functions (e.g., 1(b)-1(d)) corresponding to all the status information and historical visit information described above can be preset. The historical visit information can be based on experience and/or an analysis of user data. For example, the traffic threshold functions can be based at least in part on a statistical analysis of user data (e.g., historical visit information).

In some embodiments, a user level may be assigned according to the user's routine average visitor traffic levels. The average visitor traffic levels can be measured over a preset period of time. In some embodiments, the user level corresponding to a user is positively correlated with the routine average visitor traffic levels such that a relatively higher routine average visitor traffic for the user corresponds to a relatively higher user level. Therefore, a relatively higher user level corresponds to a relatively higher corresponding traffic threshold function $\text{Level}_1(u)$. The traffic threshold value is an increasing function for the user level of the user associated with the target IP address. Thus, the traffic threshold function $\text{Level}_1(u)$ corresponding to the user level may be set as an increasing function for user level. In some embodiments, the traffic threshold function $\text{Level}_1(u)$ corresponding to the user level is set as a linear increasing function for user level.

In some embodiments, the traffic threshold function $\text{Level}_1(u)$ corresponding to the user level of the user associated with the target IP address is expressed according to one or more of Equations (2a), (2b), or (2c).

$$Level_1(u) = l_1 u \quad (2a)$$

$$Level_1(u) = l_1 u + h_1 \quad (2b)$$

$$Level_1(u) = \begin{cases} 0, u = 1 \\ 1, u = 2 \\ 3, u = 3 \\ 5, u = 4 \end{cases} \quad (2c)$$

Referring to Equations (2a), (2b), and (2c), u is the user level of the user associated with the target IP address. The traffic threshold function $Level_1(u)$ corresponding to the user level of the user associated with the target IP address is an increasing function for the user level.

In some embodiments, the more times that the visitor traffic for the IP addresses owned by the user associated with the target IP address is forwarded to a blackhole route, the greater the likelihood (e.g., risk) that the IP addresses are under attack. As an example, the IP addresses owned by the user associated with the target IP address include the target IP address. Therefore, a greater number of times that the visitor traffic for the IP addresses was forwarded to a blackhole route within a specific period of time corresponds to a relatively smaller traffic threshold value corresponding to the IP addresses. For example, the traffic threshold value corresponding to an IP address is inversely correlated to the number of times that the visitor traffic for such IP address was forwarded to a blackhole route within a specified period of time. Therefore, the traffic threshold value is a decreasing function for the number of times that the visitor traffic for the IP addresses owned by the user associated with the target IP address was forwarded to a blackhole route within a specific historical period of time. Thus, the traffic threshold function $Black_1(b)$ may be set as a decreasing function of b, the number of times that the visitor traffic for the IP addresses owned by the user associated with the target IP address was forwarded to a blackhole route within a specific period of time.

In some embodiments, the traffic threshold function $Black_1(b)$ corresponding to the number of times that the visitor traffic for the IP addresses owned by the user associated with the target IP address was forwarded to a blackhole route within a specific period of time may be expressed according to one or more of Equations (3a), (3b), and/or (3c).

$$Black_1(b) = h_2 - l_2 b \quad (3a)$$

$$Black_1(b) = l_3 h_2 - l_2 b \quad (3b)$$

$$Black_1(b) = \begin{cases} 5, b = 0 \\ 2, b = 1 \\ 0, 1 < b < 5 \\ -1, 5 \le b < 10 \\ -2, b \ge 10 \end{cases} \quad (3c)$$

Referring to Equations (3a), (3b), and (3c), b is the number of times that the visitor traffic for the IP addresses owned by the user associated with the target IP address was forwarded to a blackhole route within a specific historical period of time. The specific period of time may be, for example, one week from the current time. Thus, b is the number of times that the visitor traffic for the IP addresses owned by the user associated with the target IP address was forwarded to a blackhole route during the past week. The traffic threshold function $Black_1(b)$ corresponding to the number of times that the visitor traffic for the IP addresses owned by the user associated with the target IP address was forwarded to a blackhole route within a specific period of time is a decreasing function for the number of times that the visitor traffic for the IP addresses owned by the user associated with the target IP address was forwarded to a blackhole route within a specific period of time.

According to some embodiments, the longer the total length of time that the IP addresses owned by the user associated with the target IP address were attacked during a specific period of time, the more often the user was under attack (the key attack target of the attacker). Therefore, a relatively longer total length of time that the IP addresses owned by the user associated with the target IP address were attacked during a specific period of time corresponds to a relatively lower traffic threshold value. Therefore, the traffic threshold value is a decreasing function for the total length of time that the IP addresses owned by the user associated with the target IP address were attacked during a specific historical period of time. Thus, the traffic threshold function $AttackTime_1(t)$ can be set as a decreasing function of the total length of time that the IP addresses owned by the user associated with the target IP address were attacked during a specific period of time.

In some embodiments, the traffic threshold function $AttackTime_1(t)$ corresponding to the total length of time that the IP addresses owned by the user associated with the target IP address were attacked during a specific period of time can be expressed according to one or more of Equations (4a), (4b), or (4c).

$$AttackTime_1(t) = h_3 - l_3 t \quad (4a)$$

$$AttackTime_1(t) = l_4 h_3 - l_3 t \quad (4b)$$

$$AttackTime_1(t) = \begin{cases} 0, t < 3 \\ 1, 3 \le t < 10 \\ -2, 10 \le t < 30 \\ -3, t \ge 30 \end{cases} \quad (4c)$$

Referring to Equations (4a), (4b), and (4c), t is the total length of time that the IP addresses owned by the user associated with the target IP address were attacked (e.g., the total length of time the number of connections exceeded the traffic threshold) during a specific historical period of time. In some embodiments, it is determined that the target IP address is/was under attack based on a statistical analysis of a length of time the number of connections exceeded the traffic threshold (e.g., using statistical analysis of in relation to historical information). For example, in the event that the total length of time the number of connections exceeded the traffic threshold is significantly higher than normal, it may be deemed that the target IP address was under attack. For example, t can be the total length of time that the IP addresses owned by the user associated with the target IP address were attacked during the past week. The traffic threshold function can be a decreasing function for the total length of time that the IP addresses owned by the user associated with the target IP address were attacked during a specific period of time.

The parameters $h_1$, $h_2$, $h_3$ and $l_1$, $l_2$, $l_3$, and $l_4$ in Equations (2a), (2b), (3a), (3b), (4a), and (4b) can be obtained through analysis of the relevant data in historical statistical information. The relevant data can include an attack event, an attack time, an attack type, the like, or any combination thereof. Equations (2c), (3c), and (4c) are preset following analysis of the relevant data in historical statistical information.

In some embodiments, traffic threshold values corresponding to the target IP address can be determined based at least in part on one or more of (i) the traffic threshold function of the user level of the user associated with the target IP address, (ii) the traffic threshold function of the number of times that the visitor traffic for the IP addresses owned by the user associated with the target IP address was forwarded to a blackhole route within a specific historical period of time, or (iii) the traffic threshold function of the total length of time that the IP addresses owned by the user associated with the target IP address were attacked during said specific period of time. The traffic threshold functions in cases (i), (ii), and (iii) above can be preset. The traffic threshold value corresponding to the target IP address can be the sum of any one or more of values obtained using the traffic threshold functions in cases (i), (ii), and (iii) above and a default traffic threshold value.

An example is given below of acquiring a traffic threshold value corresponding to the target IP address.

For example, the default traffic threshold value $h_0$ is 5 Gbps; the acquired user level that is associated with the target IP address is silver user (e.g., u=2); the number of times that the IP addresses owned by the user were forwarded to a blackhole route in the last week is 6 (e.g., b=6); and the total length of time that the IP addresses owned by the user were under attack last week is 19 hours (e.g., t=19).

In some embodiments, Equations (2c), (3c), and (4c) can be selected and used to obtain one of the values corresponding to each traffic threshold function of the user: $Level_1(u)$ =1, $Black_1(b)$=−1, and $AttackTime_1(t)$=−2, respectively. Then, by further using Equation (1a), the threshold traffic value corresponding to the target IP address can be computed to be 3 Gbps.

In some embodiments, the traffic threshold values can be set on an IP address-by-IP address basis. For example, traffic threshold values can be set for separate IP addresses of a user. In some embodiments, the traffic threshold value corresponding to the target IP address is the traffic threshold value set for the target IP address. In other words, the traffic threshold values corresponding to target IP addresses associated with the same user are not necessarily the same.

In some embodiments, obtaining a traffic threshold value corresponding to the target IP address includes obtaining the traffic threshold value corresponding to a target IP address based at least in part on (e.g., using) status information of the user associated with the target IP address and/or the historical visit information on the target IP address.

In some embodiments, obtaining the traffic threshold value corresponding to a target IP address based at least in part on (e.g., using) status information of the user associated with the target IP address and/or the historical visit information on the target IP address includes obtaining (e.g., acquiring) a rule for determining a preset traffic threshold value using status information of the user associated with the target IP address and/or the historical visit information on the target IP address as a basis for determining, in light of (e.g., by using) the traffic threshold value determining rule, the traffic threshold value corresponding to the target IP address.

The status information on the user associated with the target IP address can include the user level of the user associated with the target IP address. The historical visit information on the target IP address can include the number of times that the visitor traffic for the target IP address was forwarded to a blackhole route within a specific historical period of time and/or the total length of time that the target IP address was attacked within the specific period of time.

For example, the traffic threshold value corresponding to the target IP address can be determined based at least in part on one or more of (i) the user level of the user associated with the target IP address, (ii) the number of times that the visitor traffic for the target IP address was forwarded to a blackhole route within a specific historical period of time, or (iii) the total length of time that the target IP address was attacked within the specific period of time. The preset traffic threshold value determining rule can be used in connection with determining the traffic threshold value corresponding to the target IP address. The preset traffic threshold value determining rule can be set on the basis of analysis performed on the relevant data within a large volume of historical statistical information.

For example, the traffic threshold value formula for a traffic threshold value determining rule can be set using Equation (1a).

In some embodiments, the HoleThreshold is the traffic threshold value in Gbps; $h_0$ is the default traffic threshold value (e.g., preferably $h_0$=5 Gbps); $Level_1(u)$ is the traffic threshold function of the user level of the user associated with the target IP address; $Black_1(b)$ is the traffic threshold function of the number of times that the visitor traffic for the target IP address was forwarded to a blackhole route within a specific historical period of time; and $AttackTime_1(t)$ is the traffic threshold function of the total length of time that the target IP address was attacked during the specific historical period of time. The unit of the values in the traffic threshold functions corresponding to the historical visit information and the status information described above can be in Gbps.

The preset traffic threshold value determining rule can be obtained according to Equations (1a), (1b), (1c), or (1d). The traffic threshold value of the target IP address can be the sum of the default traffic threshold value $h_0$ and any one or more traffic threshold functions (e.g., Equations (1a), (1b), (1c), or (1d)).

The traffic threshold value determining rule can correspond to a traffic threshold value having an increasing function for the user level of the user associated with the target IP address, a decreasing function for the number of times that the visitor traffic for the target IP address was forwarded to a blackhole route within a specific historical period of time, and/or a decreasing function for the total length of time that the target IP address was attacked within the specific period of time.

According to various embodiments, the traffic threshold functions corresponding to the status information and historical visit information described above can be preset.

According to various embodiments, the traffic threshold function $Level_1(u)$ corresponding to the user level of the user associated with the target IP address is set as an increasing function for the user level.

As an example, the traffic threshold function $Level_1(u)$ corresponding to the user level of the user associated with the target IP address can be set as (e.g., computed according to) Equation (2a), (2b), or (2c). In some embodiments, u is the user level of the user associated with the target IP address. Referring to Equations (2a), (2b), and (2c), the traffic threshold function $Level_1(u)$ corresponding to the user level of the user associated with the target IP address is an increasing function for the user level.

The traffic threshold function $Black_1(b)$ corresponding to the number of times that the visitor traffic for the target IP address was forwarded to a blackhole route within a specific historical period of time can be set as a decreasing function for the number of times that the visitor traffic for the target IP address was forwarded to a blackhole route within a specific period of time.

In a specific example, the traffic threshold function $Black_1(b)$ corresponding to the number of times that the visitor traffic for the target IP address was forwarded to a blackhole route within a specific period of time may be set using one or more of Equations (3a), (3b), or (3c). In some embodiments, b is the number of times that the visitor traffic for the target IP address was forwarded to a blackhole route within a specific historical period of time. As an example, the specific period of time can be one week from the current time. Thus, b is the number of times that the visitor traffic for the target IP address was forwarded to a blackhole route during the past week. Using Equations (3a), (3b), and (3c), the traffic threshold function $Black_1(b)$ corresponding to the number of times that the visitor traffic for the target IP address was forwarded to a blackhole route within a specific period of time can be a decreasing function for the number of times that the visitor traffic for the target IP address was forwarded to a blackhole route within a specific period of time.

The traffic threshold function $AttackTime_1(t)$ corresponding to the total length of time that the target IP address was attacked within a specific period of time may be set as a decreasing function for the total length of time that the target address was attacked within a specific period of time.

In some embodiments, the traffic threshold function $AttackTime_1(t)$ corresponding to the total length of time that the target address was attacked during a specific period of time can be set using Equations (4a), (4b), and (4c). In some embodiments, t is the total length of time in hours that the target IP address was attacked during a specific historical period of time. For example, t can be the total length of time that the target IP address was attacked during the past week. Referring to Equations (4a), (4b), and (4c), the traffic threshold function of the total length of time that the target IP address was attacked during a specific period of time can be a decreasing function for the total length of time that the target address was attacked during a specific period of time.

The traffic threshold value corresponding to the target IP address can be determined on the basis of one or more of (i) the traffic threshold function of the user level of the user associated with the target IP address, (ii) the traffic threshold function of the number of times that the visitor traffic for the target IP address was forwarded to a blackhole route within a specific historical period of time, and (iii) the traffic threshold function of the total length of time that the target IP addresses were attacked during said specific period of time. The traffic threshold value corresponding to the target IP address can be the sum of any one or more of the above and a default traffic threshold value.

At 170, it is determined whether real-time visitor traffic for the target IP address exceeds the traffic threshold value. Information associated with the real-time visitor traffic can be measured or obtained from network equipment. The information associated with the real-time visitor traffic can be collected by monitoring mirror traffic. In some embodiments, the information associated with the real-time visitor traffic information includes source IP, destination IP, source port, destination port, and/or the like.

The real-time visitor traffic can be the current-time visitor traffic acquired in real time for the target IP address. In other words, it is determined in real time whether current visitor traffic (e.g., real-time visitor traffic) for the target IP address exceeds the corresponding traffic threshold value.

At 180, the visitor traffic for the target IP address is handled (e.g., routed to a blackhole route) based at least in part on whether the real-time visitor traffic for the target IP address exceeds the traffic threshold value. In some embodiments, in the event that the visitor traffic for the target IP address exceeds the traffic threshold value, at least a part of the visitor traffic for the target IP address can be routed to a blackhole route. The blackhole route can be created in response to determining that the real-time visitor traffic for the target IP address exceeds the traffic threshold value.

It is determined whether the real-time visitor traffic for the target IP address exceeds the traffic threshold value. The determination of whether the real-time visitor traffic exceeds the traffic threshold value can create two types of determination results: (i) the real-time visitor traffic for the target IP address exceeds its corresponding traffic threshold value, and (ii) the real-time visitor traffic for the target IP address does not exceed its corresponding traffic threshold value. The determination result can serve as a basis for handling the visitor traffic for the IP address. If the visitor traffic for the target IP address does not exceed the traffic threshold value, the visitor traffic for the target IP address may undergo flow cleaning. If the visitor traffic for the target IP address exceeds said traffic threshold value, the visitor traffic for the target IP address is redirected to a blackhole route. Flow (e.g., traffic) cleaning can comprise parts: system including flow detection, flow cleaning, and monitoring and management. Flow detection equipment detects illegal attacks flow hidden in the network traffic flow. For example, flow detection equipment can be configured to activate the protective equipment for flow cleaning after detecting attacks. In some embodiments, flow cleaning equipment redirects suspicious network flow (e.g., traffic) from the original network path to a purifying product, which performs the malicious traffic identification and stripping, then restores legitimate flow to the original network path transferring to the target system, while other legitimate traffic forwarding path is not affected. Monitoring and management system is used for a centralized management. The monitoring and management can includes displaying real-time traffic, event alert, state information monitoring, timely outputting flow analysis report and attack protection, and the like.

Figure 2:
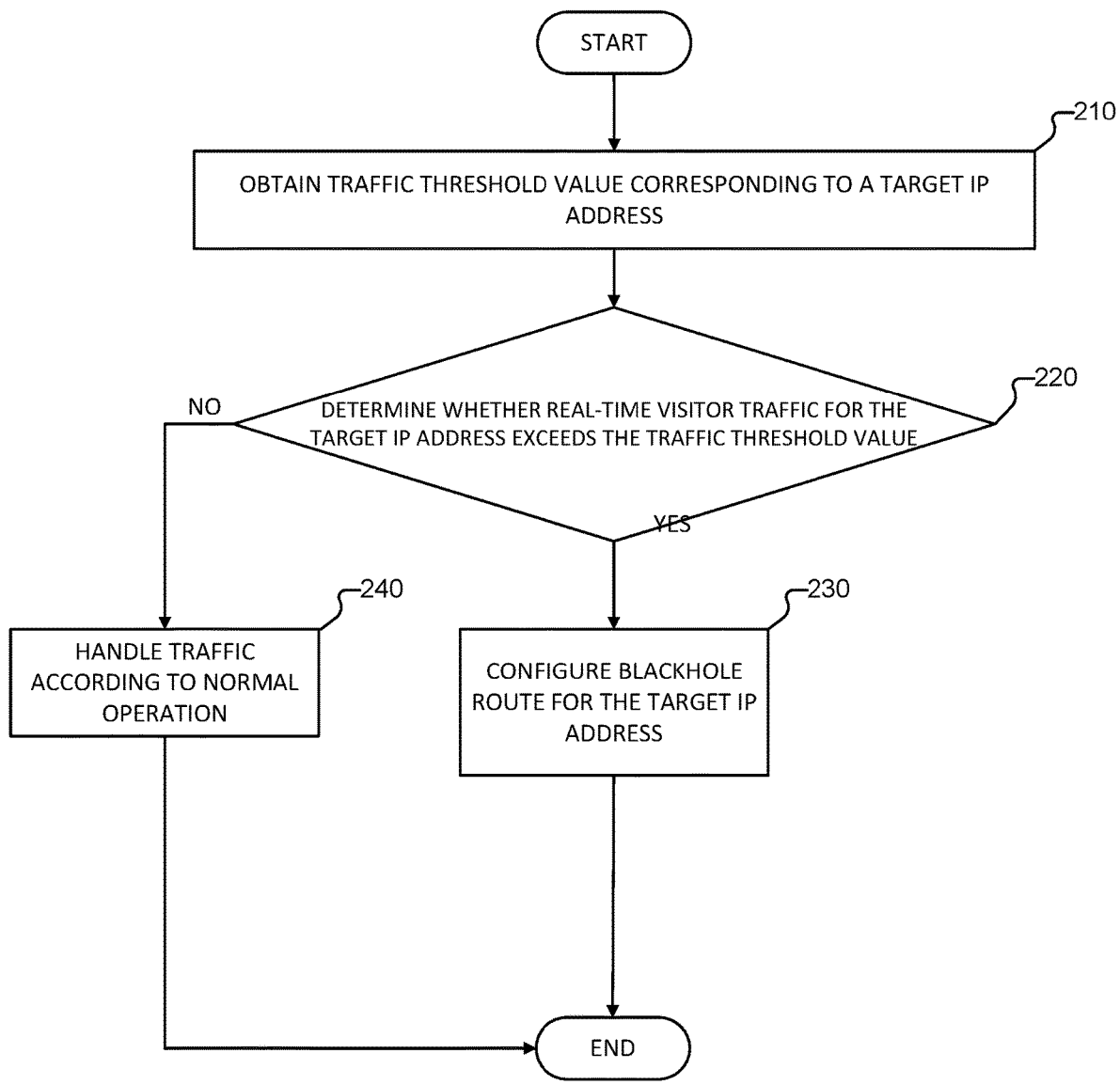
FIG. 2 is a flowchart of a method for defending against network attacks according to various embodiments of the present disclosure.

FIG. 2 is a flowchart of a method for defending against network attacks according to various embodiments of the present disclosure.

Referring to FIG. 2, process 200 for defending against network attacks is provided. Process 200 can be implemented by, for example, device 400 of FIG. 4, device 500 of FIG. 5, or computer system 600 of FIG. 6.

In some embodiments, 210 can correspond to 160 of process 150 illustrated in FIG. 1B. In some embodiments, 220 can correspond to 170 of process 150 illustrated in FIG. 1B.

If the visitor traffic for the target IP address is determined to exceed the traffic threshold value at 220, then process 200 can proceed to 230 at which a blackhole route is configured for the target IP address. In some embodiments, a network administrator admin actively creates such routing record (e.g., configures the blackhole route), which sets a specific IP source address to null0 interface. This operation rarely affects the system workload. In some embodiments, the configuration of the blackhole route can be automatically performed by a network administrator system. In the event that a blackhole route is configured (e.g., created), the visitor traffic for the target IP address is redirected to the blackhole route.

In some embodiments, if the visitor traffic for the target IP address exceeds the corresponding threshold value, the IP address (e.g., the target IP address or all IP addresses corresponding to the user associated with the target IP address) may be deemed to be under flooding attack. Thus, by configuring a blackhole route for the IP address, redirecting the visitor traffic for the IP address to a blackhole route and thus discarding the visitor traffic for the IP address are possible.

In some embodiments, the configuring of a blackhole route for the IP address includes establishing a route (e.g., adding the route to the routing table of a router) and redirecting the IP address to the null0 interface. In some embodiments, NULL0 is a logical interface of a network device (e.g., a router). The Null0 interface can be always in the UP state, without transferring any package. When the Null0 interface receives a package, the router just discards such package. In some embodiments, an IP address cannot be configured (e.g., by a user) for Null0 interface. In some embodiments, a link layer protocol cannot be encapsulated (e.g., by a user) for Null0 interface. The Null0 interface is mainly used for preventing Routing Loops and for package filtering. All of the data sent to the null0 interface will be discarded. Thus, it is possible to discard all of the traffic for the IP address.

With this approach (e.g., creating the blackhole route and redirecting visitor traffic to the target IP address to the blackhole route), if a target IP address is attacked, the visitor traffic for the attacked IP address is sacrificed, and the network bandwidth resource availability of the other unattacked IP addresses is protected. Moreover, the load this puts on the system is extremely small.

In the event that the visitor traffic for the target IP address is determined to not exceed the traffic threshold value at 220, then process 200 can proceed to 240 at which the visitor traffic is handled according to normal operation (e.g., such that the visitor traffic is directed to the target IP address rather than being redirected to a blackhole route).

Figure 3:
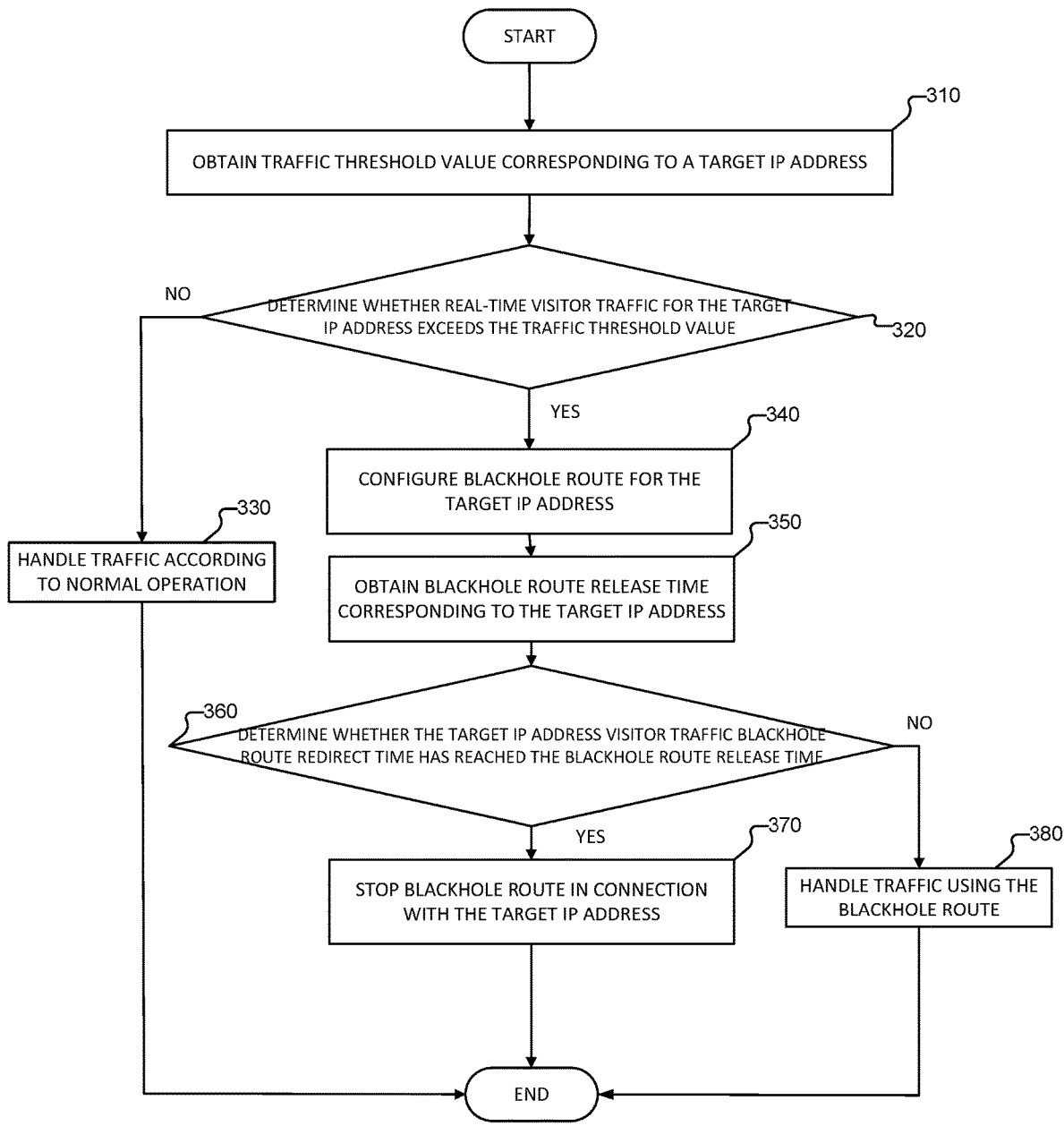
FIG. 3 is a flowchart of a method for defending against network attacks according to various embodiments of the present disclosure.

FIG. 3 is a flowchart of a method for defending against network attacks according to various embodiments of the present disclosure.

Referring to FIG. 3, process 300 for defending against network attacks is provided. Process 300 can be implemented by, for example, device 400 of FIG. 4, device 500 of FIG. 5, or computer system 600 of FIG. 6.

In some embodiments, 310 corresponds to 160 of process 150 illustrated in FIG. 1B. In some embodiments, 320 corresponds to 170 of process 150 illustrated in FIG. 1B. In some embodiments, 330 corresponds to 240 of process 200 illustrated in FIG. 2. In some embodiments, 340 corresponds to 230 of process 200 illustrated in FIG. 2.

At 350, a blackhole route release time corresponding to the target IP address is obtained. The blackhole route release time can be associated with a time at which the blackhole route is cancelled (e.g., a time at which visitor traffic directed to the IP target address is no longer routed to the blackhole). The blackhole route release time can be obtained based on statistical analysis (e.g., by one or more users) or historical information.

In some embodiments, after the visitor traffic for the target IP address of the user associated with the target IP address is redirected to the blackhole route, it may also be necessary after a period of time to cancel the blackhole route for the IP address. The blackhole route release time is the time during which the visitor traffic for the target IP address of the user associated with the target IP address is redirected to the blackhole route. When the blackhole route release time corresponding to the target address is reached, the blackhole route for the target IP address is canceled. In some embodiments, each target IP address has a corresponding blackhole route release time. The blackhole route release time can be determined on a target IP-by-target IP basis, on a user-by-user basis, or a blackhole-by-blackhole basis (e.g., at the time the blackhole is created or thereafter).

In some embodiments, a blackhole route release time can be set for a user. At the blackhole route release time, the blackhole route is released and traffic is no longer forwarded to the blackhole. For example, the blackhole route release time corresponding to the target IP address can be the blackhole route release time set for the user associated with the target IP address. In other words, the blackhole route release times corresponding to the target IP addresses associated with the same user are the same. Various sets of target IP addresses associated with the same user can have various blackhole route release times and each target IP address within a set can have the same blackhole route release time as other target IP addresses within the same set.

In some embodiments, obtaining the blackhole route release time corresponding to the target IP address includes using status information of the user associated with the target IP address and/or the historical visit information on the IP addresses owned by the user associated with the target IP address as a basis for obtaining (e.g., acquiring) the blackhole route release time corresponding to the target IP address.

The status information of the user associated with the target IP address includes the user level of the user associated with the target IP address. For example, user levels of the user associated with the target IP address can include ordinary, silver, gold, and diamond. The level parameter corresponding to each level is assigned according to a level-allocating rule. The level-allocating rule can include a mapping of a user level to a level parameter. For example, if the aforesaid ordinary, silver, gold, and diamond users are assigned according to level from low to high, the level parameters that correspond to the level-based assignments of ordinary, silver, gold, and diamond can be 1, 2, 3 and 4, respectively. The historical visit information for the IP addresses owned by the user associated with the target IP address includes the number of times that the visitor traffic for the IP addresses owned by the user associated with the target IP address was forwarded to a blackhole route within a specific historical period of time and/or the peak traffic of the IP addresses owned by the user associated with said target IP address that were attacked within the specific period of time, and/or the total length of time that the IP addresses owned by the user associated with the target IP address were attacked within the specific period of time. The number of times that the visitor traffic for the IP addresses owned by the user associated with the target IP address was forwarded to a blackhole route within a specific historical period of time is the total number of times that the visitor traffic for all of the IP addresses owned by the user was forwarded to a blackhole route within a specific historical period of time (e.g., within one week of the present time). The peak traffic of the IP addresses owned by the user associated with the target IP address that were attacked within the specific period of time can be the maximum traffic for all the IP addresses owned by the user associated with the target IP address under attack within the specific period of time. The total length of time that the IP addresses owned by the user associated with the target IP address were attacked within the specific period of time can be the total of the lengths of time that all the IP addresses owned by the user (or a defined set of the IP addresses owned by the user) were attacked within the specific period of time.

In some embodiments, obtaining the blackhole route release time corresponding to a target IP address based at least in part on the status information of the user associated with the target IP address and/or the historical visit information on the IP addresses owned by the user associated with the target IP address can include obtaining a preset rule for determining the blackhole route release time, and determining the blackhole route release time corresponding to the target IP address based at least in part on the blackhole route release time determining rule, and/or status information of the user associated with the target IP address, and/or the historical visit information on the IP addresses owned by the user associated with the target IP address.

The blackhole route release time can be determined using the preset blackhole route release time. The blackhole route release time corresponding to the IP address can be determined based at least in part on one or more of: (i) the user level of the user associated with the target IP address, (ii) the number of times that the visitor traffic for the IP addresses owned by the user associated with the target IP address was forwarded to a blackhole route within a specific historical period of time, (iii) the peak traffic of the IP addresses owned by the user associated with the target IP address that were attacked within the specific period of time, and (iv) the total length of time that the IP addresses owned by the user associated with the target IP address were attacked within the specific period of time. The preset blackhole route release time determining rule may be set (e.g., configured) based at least in part on an analysis performed on the relevant data within a large volume of historical statistical information.

In some embodiments, the blackhole route release time formula for a blackhole route release time determining rule can correspond to Equation (5a).

$$\text{ReleaseTme} = t_0 + \text{Level}_2(u) + \text{Black}_2(b) + \text{Peak}_2(a) + \text{AttackTime}_2(t) \tag{5a}$$

Referring to FIG. 5a), ReleaseTime is the blackhole route release time in hours; $t_0$ is the default blackhole route release time, preferably $t_0$=2.5 hours; $\text{Level}_2(u)$ is the blackhole route release time function of the user level; $\text{Black}_2(b)$ is the blackhole route release time function of the number of times that the visitor traffic for the IP addresses owned by the user associated with the target IP address was forwarded to a blackhole route within a specific historical period of time; $\text{Peak}_2(a)$ is the blackhole route release time function of the peak traffic of the IP addresses owned by the user associated with the target IP address that were attacked within a specific historical period of time; and $\text{AttackTime}_2(t)$ is the blackhole route release time function of the total length of time that the IP addresses owned by the user associated with the target IP address were attacked within the specific historical period of time. The unit of the values in the blackhole route release time functions corresponding to the historical visit information or the status information described above is, in every case, hours.

Various embodiments implement equations for determining the preset blackhole route release time determining rule different from Equation (5a). In some embodiments, the blackhole route release time may be the sum of the default blackhole route release time $t_0$ and any one or more blackhole route release time functions.

In some embodiments, the preset blackhole route release time determining rule can correspond to Equation (5b), Equation (5c), Equation (5d), or Equation (5e).

$$\text{ReleaseTme} = t_0 + \text{Level}_2(u) + \text{Black}_2(b) + \text{Peak}_2(a) \tag{5b}$$

$$\text{ReleaseTme} = t_0 + \text{Level}_2(u) + \text{Black}_2(b) + \text{AttackTime}_2(t) \tag{5c}$$

$$\text{ReleaseTme} = t_0 + \text{Level}_2(u) + \text{Black}_2(b) \tag{5d}$$

$$\text{ReleaseTme} = t_0 + \text{Level}_2(u) + \text{AttackTime}_2(t) \tag{5e}$$

In some embodiments, the blackhole route release time determining rule includes a blackhole route release time that is a decreasing function for the user level of the user associated with the target IP address, an increasing function for the number of times that the visitor traffic for the IP addresses owned by the user associated with the target IP address was forwarded to a blackhole route within the specific period of time, and/or an increasing function for the peak traffic of the IP addresses owned by the user associated with the target IP address that were attacked during said specific period of time, and/or an increasing function for the total length of time that the IP addresses owned by the user associated with the target IP address were attacked within the specific period of time.

The user level may be allocated on the basis of the user's routine average visitor traffic level. The routine average visitor traffic level of a user can be determined according to visitor traffic levels to one or more of the target IP addresses of the user. For example, the routine average visitor traffic level can be computed using historical information relating to visitor traffic level to the one or more target IP addresses of the user. The routine average visitor traffic level can be computed by removing statistical outliers from the historical information relating to visitor traffic level to the one or more target IP addresses of the user and taking an average. In some embodiments, a relatively higher user level corresponds to a relatively higher user's routine average visitor traffic. In some embodiments, a relatively higher routine average visitor traffic can correspond to or otherwise indicate relatively more business for the user. In some embodiments, in the event that a user has a relatively higher user level or the user is associated with relatively higher routine average visitor traffic, the user needs a relatively shorter blackhole route release time. Therefore, the blackhole route release time function $\text{Level}_2(u)$ corresponding to the user level may be set as a decreasing function for the user level.

In some embodiments, the blackhole route release time function $\text{Level}_2(u)$ corresponding to the user level may correspond to one or more of Equation (6a), Equation (6b), or Equation (6c).

$$\text{level}_2(u) = t_1 - r_1 u \tag{6a}$$

$$\text{level}_2(u) = r_2 t_1 - r_1 u \tag{6b}$$

$$\text{Level}_2(u) = \begin{cases} 0, & u = 1 \\ -0.2, & u = 2 \\ -0.5, & u = 3 \\ -1, & u = 4 \end{cases} \tag{6c}$$

Referring to Equations (6a), (6b), and (6c), u is the user level of the user associated with the target IP address. In Equations (6a), (6b), and (6c), the blackhole route release time function $\text{Level}_2(u)$ corresponding to the user level is a decreasing function for the user level. Referring to Equations (6a), (6b), and (6c), $t_1$, $r_1$, and $r_2$ can correspond to parameters that can be adjusted.

According to various embodiments, the more times that the visitor traffic for the IP addresses owned by the user associated with the target IP address was forwarded to a blackhole route, the greater the risk of the IP addresses being attacked. Therefore, the more times that the visitor traffic for the IP addresses was forwarded to a blackhole route within a specific historical period of time can correspond to a relatively longer blackhole route release time corresponding to the IP addresses. The blackhole route release time can be an increasing function for the number of times that the visitor traffic for the IP addresses owned by the user associated with the target IP address was forwarded to a blackhole route within a specific historical period of time. Thus, the blackhole route release time function $Black_2(b)$ can be set as an increasing function for the number of times that the visitor traffic for the IP addresses owned by the user associated with the target IP address was forwarded to a blackhole route within a specific period of time.

In some embodiments, the blackhole route release time function $Black_2(b)$ corresponding to the number of times that the visitor traffic for the IP addresses owned by the user associated with the target IP address was forwarded to a blackhole route within a specific period of time can correspond to one or more of Equation (7a), Equation (7b), or Equation (7c).

$$Black_2(b) = r_3 b \tag{7a}$$

$$Black_2(b) = r_3 b + t_2 \tag{7b}$$

$$Black_2(b) = \begin{cases} -0.5, & b = 0 \\ 0, & b = 1 \\ 0.5, & 1 < b < 5 \\ 1, & 5 \leq b < 10 \\ 1.5, & b \geq 10 \end{cases} \tag{7c}$$

Referring to Equations (7a), (7b), and (7c), b is the number of times that the visitor traffic for the IP addresses owned by the user associated with the target IP address was forwarded to a blackhole route within a specific historical period of time. For example, a specific period of time can be one week from the current time. Thus, b is the number of times that the visitor traffic for the IP addresses owned by the user associated with the target IP address was forwarded to a blackhole route during the past week. In Equations (7a), (7b), and (7c), the blackhole route release time function $Black_2(b)$ is an increasing function for the number of times that the visitor traffic for the IP addresses owned by the user associated with the target IP address was forwarded to a blackhole route within a specific period of time. Referring to Equations (7a), (7b), and (7c), $t_2$, and $r_3$ can correspond to parameters that can be adjusted.

In some embodiments, the greater the peak traffic of the IP addresses owned by the user associated with the target IP address that was attacked during a specific period of time, the more often the user was under attack (the key attack target of the attacker). Peak traffic can correspond to the greatest volume of traffic in historical visitor traffic information (e.g., a statistically determined level of traffic such as the greatest volume of traffic that is not an outlier in historical visitor traffic information). For example, the length of time a blackhole route should persist (e.g., the blackhole route release time) is positively correlated to the peak traffic of the IP addresses owned by the user associated with the target IP address that were attacked within a specific period of time. Therefore, the greater the peak traffic of the IP addresses owned by the user associated with the target IP address that were attacked within a specific period of time, the longer should be the blackhole route release time corresponding to the IP addresses. The blackhole route release time can be an increasing function for the peak traffic of the IP addresses owned by the user associated with the target IP address that were attacked within a specific historical period of time. Thus, the blackhole route release time function $Peak_2(a)$ can be set as an increasing function for the peak traffic of the IP addresses owned by the user associated with the target IP address that were attacked within a specific period of time.

In some embodiments, the blackhole route release time function $Peak_2(a)$ corresponding to the peak traffic of the IP addresses owned by the user associated with the target IP address that were attacked within a specific period of time can correspond to Equation (8a), Equation (8b), or Equation (8c).

$$Peak_2(a) = r_4 a \tag{8a}$$

$$Peak_2(a) = r_4 a + t_3 \tag{8b}$$

$$Peak_2(a) = \begin{cases} 0, & a < 5 \\ 0.2, & 5 \leq a < 10 \\ 0.5, & 10 \leq a < 20 \\ 1, & 20 \leq a < 50 \\ 2, & a \geq 50 \end{cases} \tag{8c}$$

Referring to Equations (8a), (8b), and (8c), $t_3$, and $r_4$ can correspond to parameters that can be adjusted. Referring to Equations (8a), (8b), and (8c), a is the peak traffic in Gbps of IP addresses owned by the user associated with the target IP address that were attacked within a specific period of time. For example, a could be the peak traffic of IP addresses owned by the user associated with the target IP address that were attacked last week. In Equations (8a), (8b), and (8c), the blackhole route release time function $Peak_2(a)$ corresponding to the peak traffic of IP addresses owned by the user associated with the target IP address that were attacked during a specific period of time is an increasing function for peak traffic of IP addresses owned by the user associated with the target IP address that were attacked during a specific period of time.

In some embodiments, a relatively longer total length of time that the IP addresses owned by the user associated with the target IP address were attacked within a specific period of time corresponds to a blackhole route release time corresponding to the IP addresses. Therefore, the blackhole route release time can be an increasing function for the total length of time that the IP addresses owned by the user associated with the target IP address were attacked within a specific historical period of time. Thus, the blackhole route release time function $AttackTime_2(t)$ corresponding to the total length of time that the IP addresses owned by the user associated with the target IP address were attacked within a specific period of time can be set as an increasing function for the total length of time that the IP addresses owned by the user associated with the target IP address were attacked within a specific period of time.

In some embodiments, the blackhole route release time function $AttackTime_2(t)$ corresponding to the total length of time that the IP addresses owned by the user associated with the target IP address were attacked during a specific period of time can correspond to Equation (9a), Equation (9b), or Equation (9c).

$$AttackTime_2(t) = t_4 + t \quad (9a)$$

$$AttackTime_2(t) = r_5 t_4 + t \quad (9b)$$

$$AttackTime_2(t) = \begin{cases} 0, & t < 3 \\ 0.2, & 3 \le t < 10 \\ 0.5, & 10 \le t < 30 \\ 1, & t \ge 30 \end{cases} \quad (9c)$$

Referring to Equations (9a), (9b), and (9c), t is the total length of time in hours that the IP addresses owned by the user associated with the target IP address were attacked within a specific historical period of time. Referring to Equations (9a), (9b), and (9c), $t_4$, and $r_5$ can correspond to parameters that can be adjusted. For example, t can be the total length of time that the IP addresses owned by the user were attacked during the past week. In Equations (9a), (9b), and (9c), the blackhole route release time function Attack-Time$_2$(t) corresponding to the total length of time that the IP addresses owned by the user associated with the target IP address were attacked within a specific period of time is an increasing function for the total length of time that the IP addresses owned by the user associated with the target IP address were attacked within a specific period of time.

Referring to Equations (6a), (6b), (7a), (7b), (8a), (8b), (9a), and (9b), the parameters $t_1$, $t_2$, $t_3$, $t_4$ and $r_1$, $r_2$, $r_3$, $r_4$, $r_5$ can be obtained through analysis of the relevant data in historical statistical information. For example, the parameters can be obtained by collecting the data and calculating the distribution by, for example, a variance formula. In some embodiments, Equations (6c), (7c), (8c), and (9c) are preset following analysis of the relevant data in historical statistical information. The relevant data can include an attack event, attack time, the volume of attacking traffic, and the like. For example, the relevant data can be obtained by collecting the data and calculating the distribution by, for example, a variance formula.

The blackhole route release time corresponding to the IP address can be determined on the basis of any one or more of the preset functions of Equations (6a), (6b), (6c), (7a), (7b), (7c), (8a), (8b), (8c), (9a), (9b) and (9c). For example, the blackhole route release time corresponding to the IP address can be determined based at least in part on one or more of (i) the blackhole route release time function of the user level of the user associated with the target IP address, (ii) the blackhole route release time function of the number of times that the visitor traffic for the IP addresses owned by the user associated with the target IP address was forwarded to a blackhole route within a specific historical period of time, (iii) the blackhole route release time function of the peak traffic value of the IP addresses owned by the user associated with the target IP address that were attacked within a specific period of time, and (iv) the blackhole route release time function of the total length of time that the IP addresses owned by the user associated with the target IP address were attacked within the specific period of time. The blackhole route release time corresponding to the IP address can be the sum of any one or more of the above blackhole route release time functions of (i)-(iv) and the default blackhole route release time.

An example is given below of acquiring the blackhole route release time corresponding to the target IP address.

For example, the default blackhole route release time $t_0$ is 2.5 hours; the acquired user level that is associated with the target IP address is silver user (e.g., u=2); the number of times that the IP addresses owned by the user were forwarded to a blackhole route in the last week is 6 (e.g., b=6); the peak traffic of the IP addresses owned by the user that were under attack last week is 8 Gbps (e.g., a=8); and the total length of time that the IP addresses owned by the user were under attack last week is 19 hours (e.g., t=19).

Using Equations (6c), (7c), (8c), and (9c), the values corresponding to each blackhole route release time of the user can be computed to correspond to Level$_2$(u)=−0.2, Black$_2$(b)=1, Peak$_2$(a)=0.2, and AttackTime$_2$(t)=0.5, respectively. Then, by further using Equation (5a), the blackhole route release time corresponding to the target IP address can be computed to be 4 hours.

In some embodiments, blackhole route release times can be separately set for the IP addresses owned by a user. The blackhole route release time corresponding to the target IP address can be the blackhole route release time set for the target IP address. In other words, the blackhole route release times corresponding to target IP addresses associated with the same user are not necessarily the same.

In some embodiments, obtaining the blackhole route release times corresponding to the target IP addresses includes obtaining the blackhole route release times corresponding to the target IP addresses based at least in part on using status information of the users associated with the target IP addresses and/or the historical visit information on the target IP addresses.

According to various embodiments, obtaining the blackhole route release times corresponding to the target IP addresses based at least in part on using status information of the users associated with the target IP addresses and/or the historical visit information on the target IP addresses includes obtaining (e.g., acquiring) a preset rule for determining the blackhole release time; and using the blackhole release time determining rule in connection with obtaining the blackhole route release times corresponding to the target IP address based at least in part on using status information of the user associated with the target IP address and/or historical visit information on the target IP address.

The status information on the user associated with the target IP address can include the user level of the user associated with the target IP address. The historical visit information on the target IP address can include the number of times that the visitor traffic for the target IP address was forwarded to a blackhole route within a specific historical period of time and/or the total length of time that the target IP address was attacked within the specific period of time.

In some embodiments, the blackhole route release time corresponding to the IP address can be determined, using a preset blackhole release time determining rule, based at least in part on (i) a user level of the user associated with the target IP address, (ii) the number of times that the visitor traffic for the target IP address was forwarded to a blackhole route within the specific historical period of time, (iii) the peak traffic value of the target IP address that was attacked within the specific period of time, and (iv) the total length of time that the target IP address was attacked within the specific period of time. In some embodiments, the preset blackhole route release time determining rule is set based at least in part on an analysis performed on the relevant data within a large volume of historical statistical information.

An example blackhole release time formula for a blackhole release time determining rule can correspond to Equation (5a).

According to various embodiments, ReleaseTime is the blackhole route release time in hours; $t_0$ is the blackhole route release time (e.g., preferably $t_0=2.5$ hours); $Level_2(u)$ is the blackhole route release time function of the user level of the user associated with the target IP address; $Black_2(b)$ is the blackhole route release time function of the number of times that the visitor traffic for the target IP address was forwarded to a blackhole route within a specific historical period of time; $Peak_2(a)$ is the blackhole route release time function of the peak traffic value of the target IP address that was attacked within a specific historical period of time; and $AttackTime_2(t)$ is the blackhole route release time function of the total length of time that the target IP address was attacked within the specific historical period of time. The unit of the values in the blackhole route release time functions corresponding to the historical visit information or the status information described above can be in hours.

According to various embodiments, the blackhole route release time is the sum of the default blackhole route release time $t_0$ and any one or more blackhole route release time functions. For example, Equation (5a) can be represented by Equations (5b), (5c), (5d), or (5e).

In one specific implementation, the blackhole route release time determining rule requires a blackhole route release time having one or more of: a decreasing function for the user level of the user associated with the target IP address, an increasing function for the number of times that the visitor traffic for the target IP address was forwarded to a blackhole route within the specific period of time, an increasing function for the peak traffic value of the target IP address that was attacked within the specific period of time, or an increasing function for the total length of time that the target IP address was attacked within the specific period of time.

The blackhole route release time function $Level_2(u)$ corresponding to the user level of the user associated with the target IP address can be set as a decreasing function for the user level.

For example, the blackhole route release time function $Level_2(u)$ corresponding to the user level of the user associated with the target IP address can be set using Equation (6a), (6b), or (6c). According to various embodiments, u is the user level of the user associated with the target IP address. In Equations (6a), (6b), and (6c), the blackhole route release time function $Level_2(u)$ corresponding to the user level associated with the target IP address is a decreasing function for the user level.

The blackhole route release time function $Black_2(b)$ corresponding to the number of times that the visitor traffic for the target IP address was forwarded to a blackhole route within a specific period of time can be set as an increasing function in relation to the number of times that the visitor traffic for the target IP address was forwarded to a blackhole route within that specific period of time.

For example, the blackhole route release time function $Black_2(b)$ corresponding to the number of times that the visitor traffic for the target IP address was forwarded to a blackhole route within a specific period of time can be set as Equation (7a), (7b), or (7c). According to various embodiments, b is the number of times that the visitor traffic for the target IP address was forwarded to a blackhole route within a specific historical period of time. As an example, a specific period of time can be one week from the current time. According to this example, b is the number of times that the visitor traffic for the target IP address was forwarded to a blackhole route during the past week. According to Equations (7a), (7b), and (7c), the blackhole route release time function $Black_2(b)$ corresponding to the number of times that the visitor traffic for the target IP address was forwarded to a blackhole route within a specific period of time is an increasing function for the number of times that the visitor traffic for the target IP address was forwarded to a blackhole route within a specific period of time.

The blackhole route release time function $Peak_2(a)$ corresponding to the peak traffic of the target IP address under attack for a specific period of time can be set as an increasing function for the peak traffic of the target IP address under attack for the specific period of time.

In some embodiments, the blackhole route release time function $Peak_2(a)$ corresponding to the peak traffic of the target address that was attacked within a specific period of time may be set according to one or more of Equations (8a), (8b), or (8c). According to various embodiments, a is the peak traffic in Gbps of the target address that was attacked within a specific historical period of time. For example, a can be the peak traffic of the target address that was attacked during the past week. In Equations (8a), (8b), and (8c), the blackhole route release time function $Peak_2(a)$ is an increasing function for the peak traffic of the target IP address under attack for the specific period of time.

The blackhole route release time function $AttackTime_2(t)$ corresponding to the total length of time that the target IP address was attacked within a specific period of time can be set as an increasing function for the total length of time that the target address was attacked within a specific period of time.

According to various embodiments, the blackhole route release time function $AttackTime_2(t)$ corresponding to the total length of time that the target address was attacked within a specific period of time is determined (e.g., computed) according to Equations (9a), (9b), or (9c). In some embodiments, t is the total length of time in hours that the target IP address was attacked within a specific historical period of time. For example, t can be the total length of time that the target IP address was attacked during the past week. In Equations (9a), (9b), and (9c), the blackhole route release time function $AttackTime_2(t)$ corresponding to the total length of time that the target IP address was attacked within a specific period of time is an increasing function for the total length of time that the target IP address was attacked within a specific period of time.

The blackhole route release time corresponding to the IP address can be determined based at least in part on one or more of (i) the blackhole route release time function of the user level of the user associated with the target IP address, (ii) the blackhole route release time function of the number of times that the visitor traffic for the target IP address was forwarded to a blackhole route within a specific historical period of time, (iii) the blackhole route release time function of the peak traffic value of the target IP address that was attacked within a specific period of time, and/or (iv) the blackhole route release time function of the total length of time that the target IP address was attacked within the specific period of time. For example, the blackhole route release time corresponding to the IP address can be the sum of any one or more of the blackhole route release time functions of cases (i)-(iv), and the default blackhole route release time.

At 360, it is determined whether the target IP address visitor traffic blackhole route redirect time has reached said blackhole route release time. For example, it can be determined whether the duration of the target IP address visitor traffic redirect to the blackhole route has reached the blackhole route release time corresponding to the IP address.

In the event that it is determined that the target IP address visitor traffic blackhole route redirect time has reached the blackhole route release time at 360, then process 300 proceeds to 370 at which the blackhole route in connection with the target IP address is stopped. For example, in the event that the time that the IP address is redirected to the blackhole route has reached said blackhole route release time, the blackhole route is released and traffic to the target IP address is no longer routed via the blackhole route. In some embodiments, in the event that the target IP address visitor traffic blackhole route redirect time has reached the blackhole route release time, the blackhole route can be stopped (e.g., eliminated, reconfigured, disabled, or re-purposed).

In some embodiments, in the event that the target IP address visitor traffic blackhole route redirect time has reached the blackhole route release time, then a stop of the blackhole route for said target IP address can be performed. As an example, to stop a blackhole route for the target IP address may include deleting the blackhole route that has been configured for the IP address and thus directing the visitor traffic for the IP address to a normal route (e.g., restoring the normal route for the IP address).

In the event that it is determined that the target IP address visitor traffic blackhole route redirect time has not reached the blackhole route release time at 360, then process 300 proceeds to 380 at which visitor traffic can be handled using the blackhole route. For example, visitor traffic to the target IP address can be routed via the blackhole route.

According to various embodiments, by acquiring the traffic threshold value corresponding to the target IP address, determining whether the real-time visitor traffic for the target IP address is greater than the corresponding traffic threshold value, and using the determination result as a basis for handling the visitor traffic for the IP address, thus it can be determined whether the visitor traffic for the IP address is to be redirected to a blackhole route according to whether the IP address visitor traffic has exceeded the corresponding traffic threshold value. Various embodiments set a traffic threshold value for the user or separately set traffic threshold values for the user's IP addresses. According to various embodiments, visitor traffic is handled based on visitor traffic blackhole route redirect threshold values corresponding to different target IP addresses or to the target IP addresses of different users. In this way, the negative effects of using a blackhole route to defend against network attacks can be reduced. According to various embodiments, in relation to a target IP address for which visitor traffic is being redirected to a blackhole route, the blackhole route release time corresponding to the IP address can be obtained and the blackhole route for the IP address can be released according to the corresponding blackhole route release time. According to various embodiments, setting the blackhole route release time for the user, or separately setting blackhole route release times for the IP addresses of the user can be performed. The blackhole route release times can be configured (separately) for different users or different IP addresses.

Figure 4:
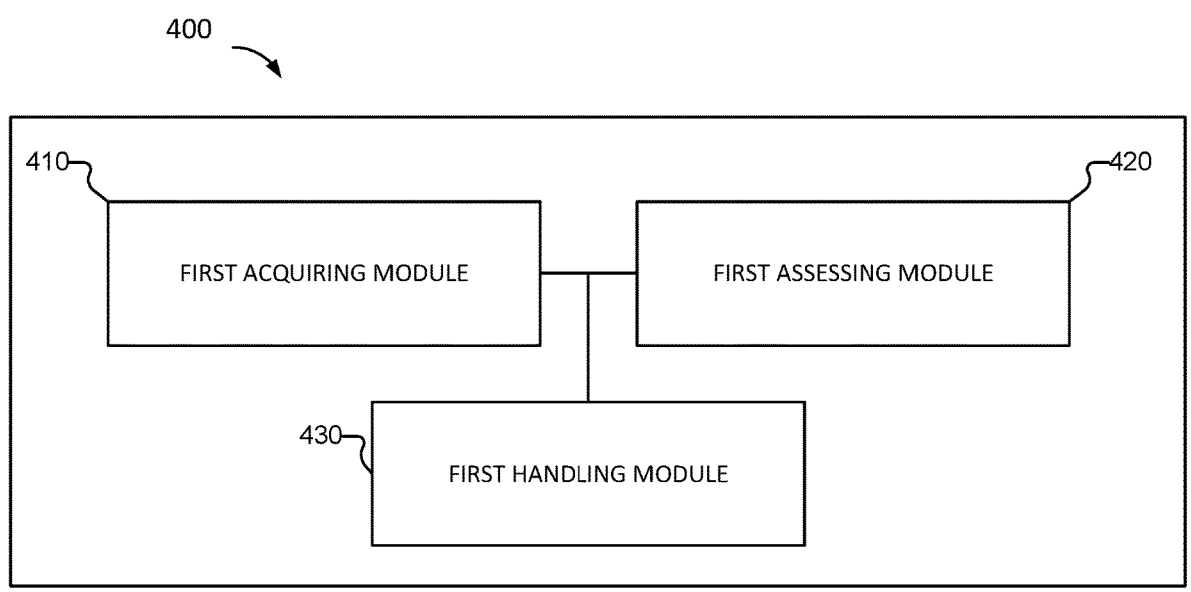
FIG. 4 is a block diagram of a device for defending against network attacks according to various embodiments of the present disclosure.

FIG. 4 is a block diagram of a device for defending against network attacks according to various embodiments of the present disclosure.

Referring to FIG. 4, a device 400 for defending against network attacks is provided. Device 400 can implement part or all of process 150 of FIG. 1B, process 200 of FIG. 2, and/or process 300 of FIG. 3. Device 400 can be implemented by computer system 600 of FIG. 6.

In some embodiments, device 400 comprises a first acquiring module 410, a first assessing module 420, and a first handling module 430.

The first acquiring module 410 can be configured to obtain the traffic threshold value corresponding to the target IP address.

The first assessing module 420 can be configured to determine whether real-time visitor traffic for the target IP address exceeds the traffic threshold value.

The first handling module 430 can be configured to handle the visitor traffic for the target IP address based at least in part on whether real-time visitor traffic for the target IP address exceeds the traffic threshold value. For example, the first handling module can be configured to route visitor traffic for the target IP address via a blackhole route. In some embodiments, the first handling module 430 can be configured to configure a blackhole route in response to it being determined that the real-time visitor traffic for the target IP address exceeds the traffic threshold value.

According to various embodiments, in the event that the visitor traffic for the target IP address exceeds the traffic threshold value, then a blackhole route is configured (e.g., by the first handling module 430 or the like) for the target IP address, and thus the visitor traffic for the target IP address is redirected (e.g., by the first handling module 430) to the blackhole route.

Figure 5:
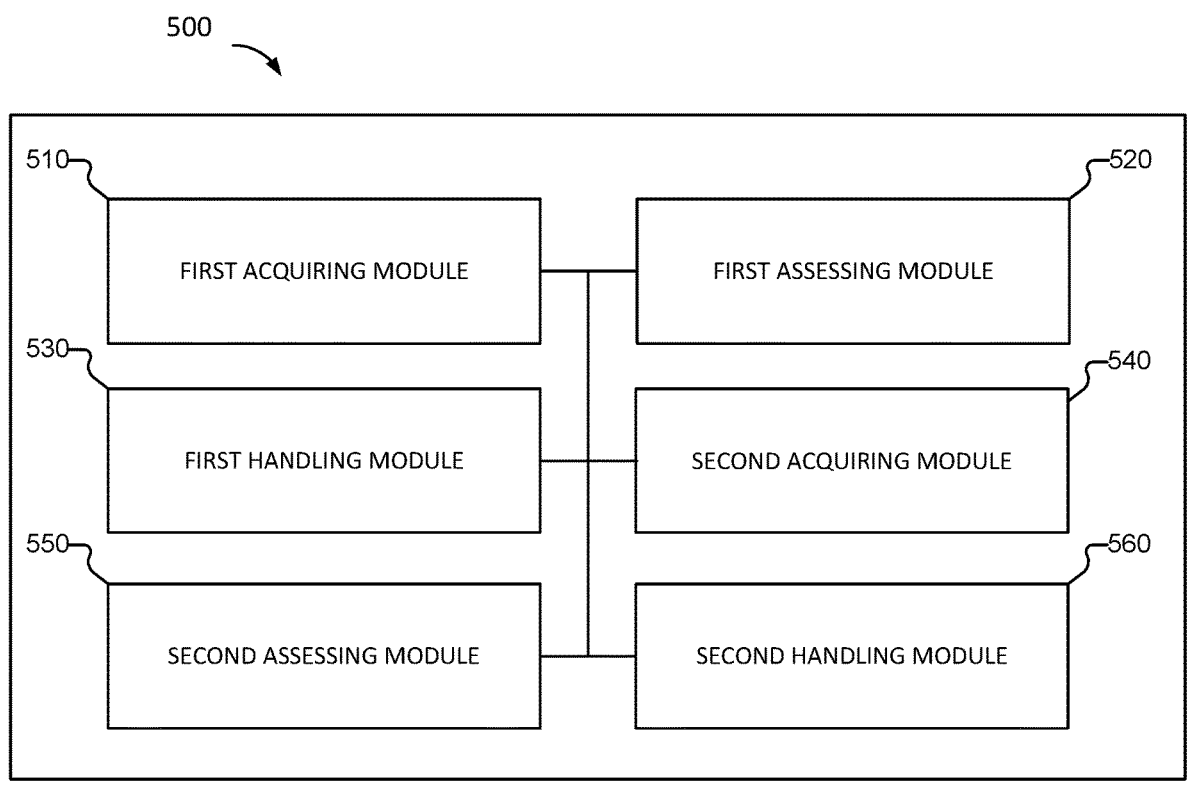
FIG. 5 is a block diagram of a device for defending against network attacks according to various embodiments of the present disclosure.

FIG. 5 is a block diagram of a device for defending against network attacks according to various embodiments of the present disclosure.

Referring to FIG. 5, a device 500 for defending against network attacks is provided. Device 500 can implement part or all of process 150 of FIG. 1B, process 200 of FIG. 2, and/or process 300 of FIG. 3. Device 500 can be implemented by computer system 600 of FIG. 6.

In some embodiments, device 500 comprises a first acquiring module 510, a first assessing module 520, a first handling module 530, a second acquiring module 540, a second assessing module 550, and a second handling module 560.

According to various embodiments, first acquiring module 510 corresponds to first acquiring module 410, first assessing module 520 corresponds to first assessing module 420, and first handling module 530 corresponds to first handling module 430.

The second acquiring module 540 can be configured to the blackhole route release time corresponding to the target IP address.

The second assessing module 550 can be configured to determine whether the target IP address visitor traffic blackhole route redirect time has reached the blackhole route release time.

The second handling module 560 can be configured to stop a blackhole route for the target IP address in the event that it is determined that the blackhole route redirect time has reached the blackhole route release time.

According to various embodiments, the first acquiring module 410 and/or first acquiring module 510 is configured such that a traffic threshold value is set for a user, wherein the traffic threshold value corresponding to the target IP address is the traffic threshold value of the user associated with the target IP address.

According to various embodiments, the first acquiring module 410 and/or first acquiring module 510 is configured such that status information of the user associated with the target IP address and/or the historical visit information on the IP addresses owned by the user associated with the target IP address serves as a basis for obtaining (e.g., acquiring) the traffic threshold value corresponding to the target IP address.

The first acquiring module 410 and/or first acquiring module 510 can comprise one or more of a first acquiring submodule or a first determining submodule.

The first acquiring submodule can be configured to obtain a preset traffic threshold value determining rule.

The first determining submodule can be configured to determine the traffic threshold value corresponding to the target IP address based at least in part on one or more of the traffic threshold value determining rule, the status information of the user associated with the target IP address, and the historical visit information on the IP addresses owned by the user associated with the target IP address.

The status information on the user associated with the target IP address can include the user level of the user associated with the target IP address. The historical visit information on the IP addresses owned by the user associated with the target IP address can include the number of times that the visitor traffic for the IP addresses owned by the user associated with the target IP address was forwarded to a blackhole route within a specific historical period of time and/or the total length of time that the IP addresses owned by the user associated with the target IP address were attacked within the specific period of time.

In some embodiments, the traffic threshold value determining rule is configured such that the traffic threshold value is an increasing function for the user level of the user associated with the target IP address, and/or a decreasing function for the number of times that the visitor traffic for the IP addresses owned by the user associated with the target IP address was forwarded to a blackhole route within a specific historical period of time, and/or a decreasing function for the total length of time that the IP addresses owned by the user associated with the target IP address were attacked within the specific period of time.

In some embodiments, the first acquiring module 410 and/or first acquiring module 510 is configured to set traffic threshold values for separate IP addresses of a user, wherein the traffic threshold value corresponding to the target IP address is the traffic threshold value set for the target IP address.

In some embodiments, the first acquiring module 410 and/or first acquiring module 510 is status information of the user associated with the target IP addresses and/or the historical visit information on the target IP addresses that serves as a basis for obtaining (e.g., acquiring) the traffic threshold values corresponding to the target IP addresses.

The first determining submodule can be configured to determine the traffic threshold value corresponding to the target IP address based at least in part on one or more of the traffic threshold value determining rule, the status information of the user associated with the target IP address, and the historical visit information on the target IP address.

The status information on the user associated with the target IP address can include the user level of the user associated with the target IP address. The historical visit information on the target IP address can include the number of times that the visitor traffic for the target IP address was forwarded to a blackhole route within a specific historical period of time and/or the total length of time that the target IP address was attacked within said specific period of time.

In some embodiments, the traffic threshold value determining rule is configured such that the traffic threshold value is an increasing function for the user level of the user associated with the target IP address, a decreasing function for the number of times that the visitor traffic for the target IP address was forwarded to a blackhole route within a specific historical period of time, and/or a decreasing function for the total length of time that the target IP address was attacked within the specific period of time.

In some embodiments, the second acquiring module 540 is configured to set a blackhole route release time for a user. The blackhole route release time corresponding to the target IP address can be the blackhole route release time set for the user associated with the target IP address.

In some embodiments, the second acquiring module 540 is configured to obtain the blackhole route release time corresponding to said target IP address based at least in part on the status information of the user associated with the target IP address and/or the historical visit information on the IP addresses owned by the user associated with the target IP address server.

The second acquiring module 540 can include a second acquiring submodule and/or a second determining submodule.

The second acquiring submodule can be configured to obtain a preset blackhole route release time determining rule.

The second determining submodule can be configured to determine the blackhole route release time corresponding to the target IP address based at least in part on one or more of the blackhole route release time determining rule, the status information of the user associated with the target IP address, and the historical visit information on the IP addresses owned by the user associated with the target IP address.

The status information on the user associated with the target IP address includes the user level of the user associated with the target IP address. The historical visit information on the IP addresses owned by the user associated with the target IP address includes the number of times that the visitor traffic for the IP addresses owned by the user associated with the target IP address was forwarded to a blackhole route within a specific historical period of time, and/or the peak traffic of the IP addresses owned by the user associated with the target IP address that were attacked within said specific period of time, and/or the total length of time that the IP addresses owned by the user associated with the target IP address were attacked within the specific period of time.

In some embodiments, the blackhole route release time determining rule includes a blackhole route release time that is a decreasing function in relation to the user level of the user associated with the target IP address, an increasing function in relation to the number of times that the visitor traffic for the IP addresses owned by the user associated with the target IP address was forwarded to a blackhole route within the specific period of time, and/or an increasing function in relation to the peak traffic of the IP addresses owned by the user associated with the target IP address that were attacked during the specific period of time, and/or an increasing function in relation to the total length of time that the IP addresses owned by the user associated with the target IP address were attacked within the specific period of time.

In some embodiments, the second acquiring module 540 is further configured to separately set blackhole route release times for the IP addresses owned by a user. In some embodiments, the second acquiring module 540 is further configured to separately set the blackhole route release time corresponding to the target IP address for the target IP address.

In some embodiments, the status information of the user associated with the target IP addresses and/or the historical visit information on the target IP addresses serves as a basis for acquiring the blackhole route release times corresponding to the target IP addresses.

The status information on the user associated with the target IP address can include the user level of the user associated with the target IP address. The historical visit information on the target IP address can include the number of times that the visitor traffic for the IP addresses owned by the user associated with the target IP address was forwarded to a blackhole route within a specific historical period of time, the peak traffic of the target IP address that was attacked within the specific period of time, and/or the total length of time that the target IP address was attacked within the specific period of time.

According to various embodiments of the present disclosure, the blackhole route release time determining rule corresponds to a blackhole route release time that includes (e.g., or corresponds to) one or more of a decreasing function in relation to the user level of the user associated with the target IP address, an increasing function in relation to the number of times that the visitor traffic for the target IP address was forwarded to a blackhole route within the specific period of time, an increasing function in relation to the peak traffic value of the target IP address that was attacked within the specific period of time, and an increasing function in relation to the total length of time that the target IP address was attacked within the specific period of time.

Figure 6:
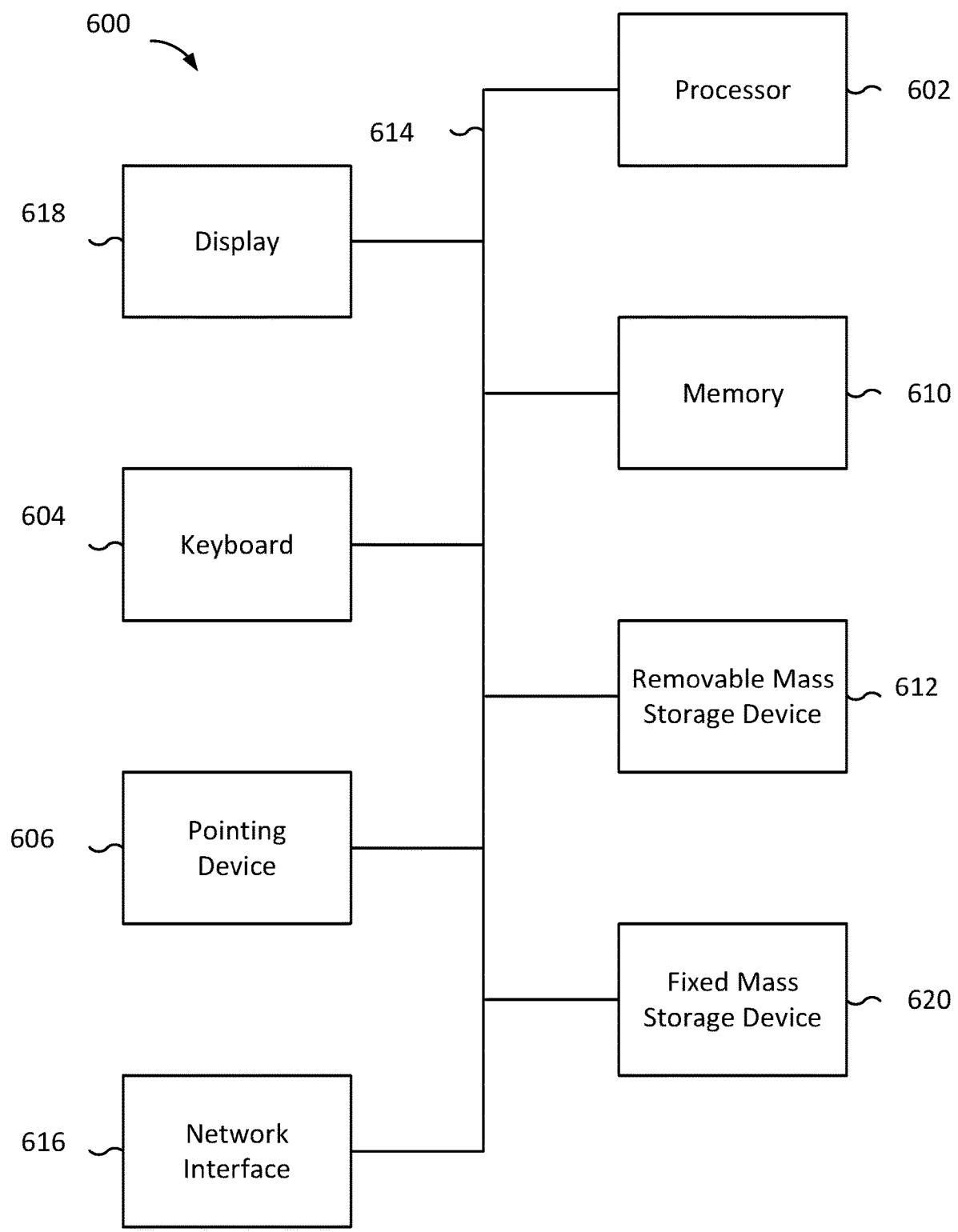
FIG. 6 is a functional diagram of a computer system for defending against network attacks according to various embodiments of the present disclosure.

FIG. 6 is a functional diagram of a computer system for defending against network attacks according to various embodiments of the present disclosure.

Referring to FIG. 6, a computer system 600 for defending against network attacks is displayed. Computer system 600 can implement process 150 of FIG. 1B, process 200 of FIG. 2, process 300 of FIG. 3, device 400 of FIG. 4, and device 500 of FIG. 5. As will be apparent, other computer system architectures and configurations can be used to implement a display interface. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown). The memory can be a non-transitory computer-readable storage medium.

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

The units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

Furthermore, the functional units in the various embodiments of the present invention can be integrated into one processing unit, or each unit can have an independent physical existence, or two or more units can be integrated into a single unit. The aforesaid integrated units can take the form of hardware, or they can take the form of hardware combined with software function units.

The units described above in which the software function units are integrated can be stored in a computer-readable storage medium. The software function units described above are stored in a storage medium and include a number of commands whose purpose is to cause a piece of computer equipment (which can be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, or optical disk, or various other media that can store program code.

Please note that the various embodiments may be implemented in software and/or in a combination of software and hardware. For example, various devices of the present application may be implemented using an application-specific integrated circuit (ASIC) or any other similar hardware. In some embodiments, the software program of the present application may use processors to implement the steps or functions described above. Similarly, the software program (including associated data structures) of the present application may be stored in computer-readable recording media such as RAM storage devices, magnetic or optical drives, floppy disks, or similar equipment. In addition, some of the steps or functions of the present application may be implemented through hardware, e.g., circuits that in combination with processors execute various steps or functions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of defending against website attacks, comprising:
   obtaining, by one or more processors, a traffic threshold value corresponding to a target IP address, wherein the traffic threshold value is determined based at least in part on a summation of at least:
      a value pertaining to a user level of a user associated with the target IP address;
      a value pertaining to a number of times that visitor traffic to the target IP address was forwarded to one or more previous blackhole routes within a specific historical period of time; and
      a value pertaining to a length of time that at least the target IP address was attacked during the specific historical period of time;
   determining, by the one or more processors, whether real-time visitor traffic for the target IP address exceeds the traffic threshold value; and
   handling, by one or more processors, incoming visitor traffic for the target IP address based at least in part on whether the real-time visitor traffic for the target IP address exceeds the traffic threshold value, wherein the handling of incoming visitor traffic for the target IP address based at least in part on whether the real-time visitor traffic for the target IP address exceeds the traffic threshold value comprises:
      in response to a determination that the real-time visitor traffic for the target IP address exceeds the traffic threshold value:
         configuring a blackhole route for the target IP address;
         obtaining a blackhole route release time corresponding to the blackhole route, wherein:
            the blackhole route release time is an amount of time after which the blackhole route is to be cancelled;
            the blackhole route release time is determined based at least in part on one or more blackhole route release time determining rules and a summation of at least values pertaining to one or more characteristics of historical traffic to the target IP address to the target IP address; and
            the values pertaining to the one or more characteristics of the historical traffic to the target IP address include a value corresponding to the number of times visitor traffic to the target IP address was forwarded to the blackhole route within the specific historical period of time, a value corresponding to a peak amount traffic for the target IP during the specific historical period of time, or both; and
         redirecting the incoming visitor traffic for the target IP address to the blackhole route until the blackhole release time corresponding to the blackhole route has been reached.

2. The method of claim 1, wherein the handling of incoming visitor traffic for the target IP address based at least in part on whether the real-time visitor traffic for the target IP address exceeds the traffic threshold value comprises:
   in response to a determination that the real-time visitor traffic for the target IP address exceeds the traffic threshold value:
      determining whether a blackhole route redirect time associated with the target IP address incoming visitor traffic has reached the blackhole route release time; and
      in response to a determination that the blackhole route redirect time has reached the blackhole route release time, stopping the blackhole route.

3. The method of claim 1, wherein a traffic threshold value is configured to a corresponding value for a corresponding user, and the traffic threshold value corresponding to the target IP address is the traffic threshold value of the corresponding user associated with the target IP address.

4. The method of claim 1, wherein a plurality of traffic threshold values are configured separately for a corresponding plurality of IP addresses associated with a user, and the traffic threshold value corresponding to the target IP address is the traffic threshold value set for that target IP address.

5. The method of claim 1, wherein
the traffic threshold value corresponding to the target IP address is based at least in part on one or more of: status information of a user associated with the target IP address, historical visit information on a plurality of IP addresses associated with the user associated with the target IP address, or both.

6. The method of claim 1, wherein the obtaining of the traffic threshold value corresponding to the target IP address comprises:
obtaining a plurality of traffic threshold values corresponding to ones of a plurality of target IP addresses of a user, the plurality of traffic threshold values being obtained based at least in part on: status information of the user associated with the target IP addresses, historical visit information on the target IP addresses, or both.

7. The method of claim 1, wherein the obtaining of the traffic threshold value corresponding to the target IP address comprises:
obtaining a preset traffic threshold value determining rule; and
determining the traffic threshold value corresponding to the target IP address based at least in part on one or more of: the preset traffic threshold value determining rule, and a summation of a value pertaining to status information of a user associated with the target IP address, a value pertaining to historical visit information on the target IP address, and a value pertaining to historical visit information on a plurality of IP addresses owned by the user associated with the target IP address.

8. The method of claim 1, wherein the obtaining of the traffic threshold value corresponding to the target IP address comprises:
determining the traffic threshold value corresponding to the target IP address based at least in part on one or more of: a preset traffic threshold value determining rule, status information of a user associated with the target IP address, and historical visit information on a plurality of IP addresses owned by the user associated with the target IP address,
wherein:
the historical visit information on the plurality of IP addresses owned by the user associated with the target IP address comprises: a number of times that visitor traffic for the plurality of IP addresses owned by the user associated with the target IP address was forwarded to the one or more previous blackhole routes within the specific historical period of time, a total length of time that the plurality of IP addresses owned by the user associated with the target IP address were attacked within the specific historical period of time, or both.

9. The method of claim 1, wherein the obtaining of the traffic threshold value corresponding to the target IP address comprises:
obtaining a preset traffic threshold value determining rule; and
determining the traffic threshold value corresponding to the target IP address based at least in part on one or more of: the preset traffic threshold value determining rule, status information of a user associated with the target IP address, and historical visit information on a plurality of IP addresses owned by the user associated with the target IP address,
wherein the traffic threshold value is determined based on one or more of: an increasing function in relation to a user level of the user associated with the target IP address, a decreasing function in relation to a number of times that visitor traffic for the plurality of IP addresses owned by the user associated with the target IP address was forwarded to the one or more previous blackhole routes within the specific historical period of time, and a decreasing function in relation to a total length of time that the plurality of IP addresses owned by the user associated with the target IP address were attacked within the specific historical period of time.

10. The method of claim 1, wherein the obtaining of the traffic threshold value corresponding to the target IP address comprises:
obtaining a preset traffic threshold value determining rule; and
determining the traffic threshold value corresponding to the target IP address based at least in part on one or more of the preset traffic threshold value determining rule, status information of a user associated with the target IP address, or historical visit information on the target IP address,
wherein:
the historical visit information on the target IP address comprises one or more of: a number of times that the incoming visitor traffic for the target IP address was forwarded to the one or more previous blackhole routes within the specific historical period of time, and a total length of time that the target IP address was attacked within the specific historical period of time.

11. The method of claim 1, wherein the obtaining of the traffic threshold value corresponding to the target IP address comprises:
obtaining a preset traffic threshold value determining rule; and
determining the traffic threshold value corresponding to the target IP address based at least in part on the preset traffic threshold value determining rule,
wherein the traffic threshold value corresponds to one or more of: an increasing function in relation to a user level of a user associated with the target IP address, a decreasing function in relation to the number of times that the incoming visitor traffic for the target IP address was forwarded to the one or more previous blackhole routes within the specific historical period of time, and a decreasing function in relation to a total length of time that the target IP address was attacked within the specific historical period of time.

12. The method of claim 1, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
configuring the blackhole route for the target IP address;
redirecting the incoming visitor traffic for the target IP address to the blackhole route;
determining whether a blackhole route redirect time of the target IP address incoming visitor traffic has reached the blackhole route release time; and in response to a determination that blackhole route redirect time has reached the blackhole route release time, stopping the blackhole route,
wherein the blackhole route release time is set for a user, and the blackhole route release time corresponding to the target IP address is the blackhole route release time set for the user associated with the target IP address.

13. The method of claim 1, wherein,
in response to a determination that the real-time visitor traffic for the target IP address exceeds the traffic threshold value:
determining whether a blackhole route redirect time associated with the target IP address incoming visitor traffic has reached the blackhole route release time; and
in response to a determination that the blackhole route redirect time has reached the blackhole route release time, stopping the blackhole route,
wherein a plurality of blackhole route release times are set separately for a plurality of IP addresses owned by a user, and the blackhole route release time corresponding to the target IP address corresponds to a blackhole route release time set for the target IP address.

14. The method of claim 1, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
determining whether a blackhole route redirect time associated with the target IP address incoming visitor traffic has reached the blackhole route release time, wherein the blackhole release time corresponding to the blackhole route is further obtained based at least in part on status information of a user associated with the target IP address; and
in response to a determination that the blackhole route redirect time has reached the blackhole route release time, stopping the blackhole route.

15. The method of claim 1, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
determining whether a blackhole route redirect time associated with the target IP address incoming visitor traffic has reached the blackhole route release time, wherein the blackhole release time corresponding to the blackhole route is further based at least in part on status information of a user associated with a plurality of target IP addresses; and
in response to a determination that the blackhole route redirect time has reached the blackhole route release time, stopping the blackhole route.

16. The method of claim 1, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
obtaining a preset blackhole route release time determining rule;
determining whether a blackhole route redirect time associated with the target IP address incoming visitor traffic has reached the blackhole route release time, wherein the blackhole release time corresponding to the blackhole route is further based at least in part on status information of a user associated with a plurality of target IP addresses; and
in response to a determination that the blackhole route redirect time has reached the blackhole route release time, stopping the blackhole route.

17. The method of claim 1, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
obtaining a preset blackhole route release time determining rule;
determining whether a blackhole route redirect time associated with the target IP address incoming visitor traffic has reached the blackhole route release time, wherein the blackhole release time corresponding to the blackhole route is further based at least in part on status information of a user associated with a plurality of target IP addresses; and
in response to a determination that the blackhole route redirect time has reached the blackhole route release time, stopping the blackhole route,
wherein:
the status information of the user associated with the plurality of target IP address comprises a user level of the user associated with the target IP address; and
the historical visit information on the plurality of target IP addresses comprises one or more of: a number of times that incoming visitor traffic for the plurality of target IP addresses owned by the user associated with the target IP address was forwarded to the blackhole route within the specific historical period of time, the peak traffic of the IP addresses owned by the user associated with the target IP address that were attacked within the specific historical period of time, and a total length of time that the IP addresses owned by the user associated with the target IP address were attacked within the specific historical period of time.

18. The method of claim 1, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
obtaining a preset blackhole route release time determining rule;
determining whether a blackhole route redirect time associated with the target IP address incoming visitor traffic has reached the blackhole route release time; and
in response to a determination that the blackhole route redirect time has reached the blackhole route release time, stopping the blackhole route
wherein the blackhole route release time is determined further based on one or more of: status information of a user associated with a plurality of target IP addresses, and historical visit information on the target IP addresses, a decreasing function in relation to one or more user levels of the user associated with the target IP address, an increasing function in relation to the number of times that incoming visitor traffic for the plurality of IP addresses owned by the user associated with the target IP address was forwarded to the blackhole route within a specific period of time, an increasing function in relation to the peak traffic of the plurality of IP addresses owned by the user associated with the target IP address that were attacked during the specific period of time, and an increasing function in relation to a total length of time that the plurality of IP addresses owned by the user associated with the target IP address were attacked within the specific period of time.

19. The method of claim 1, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
obtaining a preset blackhole route release time determining rule;
determining whether a blackhole route redirect time associated with the target IP address incoming visitor traffic has reached the blackhole route release time, wherein the blackhole release time corresponding to the blackhole route is further based at least in part on status information of a user associated with a plurality of target IP addresses; and
in response to a determination that the blackhole route redirect time has reached the blackhole route release time, stopping the blackhole route,
wherein:
the historical visit information on the plurality of target IP address comprises one or more of: the number of times that the incoming visitor traffic for the plurality of IP addresses owned by the user associated with the target IP address was forwarded to the blackhole route within the specific historical period of time, the peak traffic of the target IP address that was attacked within the specific historical period of time, and a total length of time that the target IP address was attacked within the specific historical period of time.

20. The method of claim 1, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
obtaining a preset blackhole route release time determining rule;
determining whether a blackhole route redirect time associated with the target IP address incoming visitor traffic has reached the blackhole route release time; and
in response to a determination that the blackhole route redirect time has reached the blackhole route release time, stopping the blackhole route,
wherein the blackhole route release time is determined further based on one or more of: status information of a user associated with a plurality of target IP addresses, or historical visit information on the target IP addresses, a decreasing function in relation to one or more user levels of the user associated with the target IP address, an increasing function in relation to the number of times that the incoming visitor traffic for the target IP address was forwarded to the blackhole route within the specific period of time, an increasing function in relation to the peak traffic value of the target IP address that was attacked within the specific period of time, or an increasing function in relation to a total length of time that the target IP address was attacked within the specific period of time.

21. A computer program product, the computer program product being embodied in a non-transitory computer readable storage medium and comprising computer instructions for:
obtaining a traffic threshold value corresponding to a target IP address, wherein the traffic threshold value is determined based at least in part on a summation of at least:
a value pertaining to a user level of a user associated with the target IP address;
a value pertaining to a number of times that visitor traffic to the target IP address was forwarded to one or more previous blackhole routes within a specific historical period of time; and
a value pertaining to a length of time that at least the target IP address was attacked during the specific historical period of time;
determining whether real-time visitor traffic for the target IP address exceeds the traffic threshold value; and
handling incoming visitor traffic for the target IP address based at least in part on whether the real-time visitor traffic for the target IP address exceeds the traffic threshold value, wherein the handling of incoming visitor traffic for the target IP address based at least in part on whether the real-time visitor traffic for the target IP address exceeds the traffic threshold value comprises:
in response to a determination that the real-time visitor traffic for the target IP address exceeds the traffic threshold value:
configuring a blackhole route for the target IP address;
obtaining a blackhole route release time corresponding to the blackhole route, wherein:
the blackhole route release time is an amount of time after which the blackhole route is to be cancelled, and cancelled;
the blackhole route release time is determined based at least in part on one or more blackhole route release time determining rules and a summation of at least values pertaining to one or more characteristics of historical traffic to the target IP address to the target IP address; and
the values pertaining to the one or more characteristics of the historical traffic to the target IP address includes a value corresponding to the number of times visitor traffic to the target IP address was forwarded to the blackhole route within the specific historical period of time, a value corresponding to a peak amount traffic for the target IP during the specific historical period of time, or both; and
redirecting the incoming visitor traffic for the target IP address to the blackhole route until the blackhole release time corresponding to the blackhole route has been reached.

22. A system for defending against website attacks, the system comprising:

at least one processor configured to:
  obtain a traffic threshold value corresponding to a target IP address, wherein the traffic threshold value is determined based at least in part on a summation of at least:
    a value pertaining to a user level of a user associated with the target IP address;
    a value pertaining to a number of times that visitor traffic to the target IP address was forwarded to one or more previous blackhole routes within a specific historical period of time; and
    a value pertaining to a length of time that at least the target IP address was attacked during the specific historical period of time;
  determine whether real-time visitor traffic for the target IP address exceeds the traffic threshold value; and
  handle incoming visitor traffic for the target IP address based at least in part on whether the real-time visitor traffic for the target IP address exceeds the traffic threshold value, wherein to handle incoming visitor traffic for the target IP address based at least in part on whether the real-time visitor traffic for the target IP address exceeds the traffic threshold value comprises:
    in response to a determination that the real-time visitor traffic for the target IP address exceeds the traffic threshold value:
      configure a blackhole route for the target IP address;
      obtain a blackhole route release time corresponding to the blackhole route, wherein:
        the blackhole route release time is an amount of time after which the blackhole route is to be cancelled;
        the blackhole route release time is determined based at least in part on one or more blackhole route release time determining rules and a summation of at least values pertaining to one or more characteristics of historical traffic to the target IP address to the target IP address; and
        the values pertaining to the one or more characteristics of the historical traffic to the target IP address include a value corresponding to the number of times visitor traffic to the target IP address was forwarded to the blackhole route within the specific historical period of time, a value corresponding to a peak amount traffic for the target IP during the specific historical period of time, or both; and
      redirect the incoming visitor traffic for the target IP address to the blackhole route until the blackhole release time corresponding to the blackhole route has been reached; and
  a memory coupled to the at least one processor and configured to provide the at least one processor with instructions.

23. The method of claim 1, wherein the determining whether the real-time visitor traffic for the target IP address exceeds the traffic threshold comprises determining whether traffic from a plurality of source IP addresses directed to the target IP address exceeds the traffic threshold.

24. The method of claim 1, wherein the configuring the blackhole route for the target IP address comprises configuring a null0 interface for the target IP address.

25. The method of claim 1, wherein the blackhole route is maintained for a period of time that is determined based at least in part on historical traffic information pertaining to the target IP address.

* * * * *

UNITED STATES PATENT AND TRADEMARK OFFICE
CERTIFICATE OF CORRECTION

PATENT NO. : 10,931,710 B2
APPLICATION NO. : 15/153534
DATED : February 23, 2021
INVENTOR(S) : Han Li, Yaxiong Duan and Jiong Jia Page 1 of 1

It is certified that error appears in the above-identified patent and that said Letters Patent is hereby corrected as shown below:

On the Title Page

Item (73), assignee, country, insert --(KY)--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*